US011070279B2

(12) United States Patent
Raghavan et al.

(10) Patent No.: US 11,070,279 B2
(45) Date of Patent: Jul. 20, 2021

(54) FLEXIBLE BEAMFORMING TECHNIQUES FOR WIRELESS DEVICES

(71) Applicant: QUALCOMM incorporated, San Diego, CA (US)

(72) Inventors: Vasanthan Raghavan, West Windsor Township, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/683,105

(22) Filed: Nov. 13, 2019

(65) Prior Publication Data
US 2020/0195336 A1    Jun. 18, 2020

Related U.S. Application Data

(60) Provisional application No. 62/780,142, filed on Dec. 14, 2018.

(51) Int. Cl.
*H04M 1/00* (2006.01)
*H04B 7/08* (2006.01)
(Continued)

(52) U.S. Cl.
CPC ......... *H04B 7/0874* (2013.01); *H04B 7/0691* (2013.01); *H04M 1/0214* (2013.01); *H04M 1/0241* (2013.01); *H04W 88/02* (2013.01)

(58) Field of Classification Search
CPC .. H04B 7/0617; H04B 7/0695; H04B 7/0408; H04B 7/088; H04B 7/0802;
(Continued)

(56) References Cited

U.S. PATENT DOCUMENTS

| 10,200,148 B1* | 2/2019 | Gao ........................ H04L 1/206 |
| 2002/0039914 A1* | 4/2002 | Hama ................... H04M 1/575 |
| | | 455/566 |

(Continued)

FOREIGN PATENT DOCUMENTS

| EP | 2644002 A1 | 10/2013 |
| EP | 2840816 A1 | 2/2015 |

(Continued)

OTHER PUBLICATIONS

Apple: "Discussion on UE Feature List", 3GPP Draft, 3GPP TSG RAN WG1 Meeting #94, R1-1808610 Discussion on UE Feature List, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 11, 2018 (Aug. 11, 2018), XP051515987, 7 Pages, Retrieved from the Internet: URL: http://www.3gpp.org/ftp/tsg%5Fran/WG1%5FRL1/TSGR1%5F94/Docs/R1%2D1808610%2Ezip [retrieved on Aug. 11, 2018], p. 5-p. 6.

(Continued)

*Primary Examiner* — Nhan T Le
(74) *Attorney, Agent, or Firm* — Holland & Hart LLP/Qualcomm Incorporated

(57) ABSTRACT

Methods, systems, and devices for wireless communications are described. A wireless device such as a user equipment (UE) may include multiple antenna arrays used to support wireless communications. The antenna arrays may be located at different parts of the UE and may allow the UE to flexibly perform beamforming communications. The antenna arrays maybe configured as antenna sets, and the size of each antenna set may vary based on the configuration of the UE. For example, a UE may include a foldable display having multiple foldable display units, and the communication parameters used for transmission and reception of signals via the antenna arrays may depend on the configu- (Continued)

ration of the foldable display units. In some aspects, a state of the foldable display units or the arrangement of the antenna arrays relative to one another may be used to configure and perform beamforming communications between the UE and a base station.

30 Claims, 27 Drawing Sheets

(51) Int. Cl.
*H04M 1/02* (2006.01)
*H04B 7/06* (2006.01)
*H04W 88/02* (2009.01)

(58) Field of Classification Search
CPC ... H04B 7/0874; H04B 7/0897; H04W 16/28; H04W 88/02; H04M 1/0214; H04M 1/0216; H04M 1/0241
See application file for complete search history.

(56) References Cited

U.S. PATENT DOCUMENTS

| | | | |
|---|---|---|---|
| 2007/0232314 A1 | 10/2007 | Kolding et al. | |
| 2012/0328031 A1 | 12/2012 | Pajukoski et al. | |
| 2014/0177531 A1 | 6/2014 | Imamura et al. | |
| 2014/0240178 A1 | 8/2014 | Chun et al. | |
| 2014/0247796 A1 | 9/2014 | Ouchi et al. | |
| 2016/0037541 A1 | 2/2016 | Kim et al. | |
| 2016/0295323 A1* | 10/2016 | Yliaho | H04R 1/406 |
| 2017/0373745 A1 | 12/2017 | Park et al. | |
| 2018/0102817 A1 | 4/2018 | Park et al. | |
| 2018/0115357 A1 | 4/2018 | Park et al. | |
| 2018/0139780 A1 | 5/2018 | Kang et al. | |
| 2018/0183503 A1 | 6/2018 | Rahman et al. | |
| 2018/0227094 A1 | 8/2018 | Liu et al. | |
| 2019/0090137 A1 | 3/2019 | Cutcher et al. | |
| 2019/0116467 A1 | 4/2019 | Belleschi et al. | |
| 2019/0364492 A1 | 11/2019 | Azizi et al. | |
| 2020/0195320 A1 | 6/2020 | Raghavan et al. | |
| 2020/0205073 A1 | 6/2020 | Akkarakaran et al. | |
| 2020/0374730 A1 | 11/2020 | Gao et al. | |

FOREIGN PATENT DOCUMENTS

| | | |
|---|---|---|
| WO | WO-2017197237 A1 | 11/2017 |
| WO | WO-2018127560 A1 | 7/2018 |

OTHER PUBLICATIONS

Huawei, et al., "Beam Measurement and Reporting", 3GPP Draft, 3GPP TSG RAN WG1 Meeting NR#3, R1-1715467, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017 (Sep. 17, 2017), XP051338935, 9 Pages, Retrieved from the Internet: URL:http://www.3gpp.org/ftp/Meetings_3GPP_SYNC/RAN1/Docs/, [retrieved on Sep. 17, 2017], Sections 1, 3.1, 4.4.
Intel Corporation: "On Codebook Based UL Transmission", 3GPP Draft, 3GPP TSG RAN WG1 Meeting #90, R1-1712537, on Codebook Based UL Transmission, 3rd Generation Partnership Project (3GPP), Mobile Competence Centre, 650, Route Des Lucioles, F06921 Sophia-Antipolis Cedex, France, vol. RAN WG1, No. Prague, P.R. Czechia, Aug. 21, 2017-Aug. 25, 2017, Aug. 20, 2017, XP051315353, 6 pages, Retrieved from the Internet: URL:http://www.3gpp.org/ftp/Meetings_3GPP_SYNC/RAN1/Docs/, [retrieved on Aug. 20, 2017], Section 1, "Introduction" and section 2.1, "UE antenna Structure".
International Search Report and Written Opinion—PCT/US2019/061398—ISA/EPO—dated Mar. 19, 2020 (190389WO).
Pradhan C., et al, "Joint Beamwidth and Energy Optimization for Multi-User Millimeter Wave Communications", 2018 IEEE International Conference on Communications Workshops (ICC Workshops), IEEE, May 20, 2018 (May 20, 2018), pp. 1-6, XP033369908, DOI: 10.1109/ICCW.2018.8403597, [retrieved on Jul. 3, 2018], Chapter IV.C, p. 5.
Partial International Search Report—PCT/US2019/061398—ISA/EPO—dated Feb. 4, 2020 (190389WO).
NTT DOCOMO, "Technical Journal," Jul. 2017, vol. 19, No. 1, 48 pages.

* cited by examiner

FLEXIBLE BEAMFORMING TECHNIQUES FOR WIRELESS DEVICES

CROSS REFERENCE

The present application for patent claims the benefit of U.S. Provisional Patent Application No. 62/780,142 by Raghavan et al., entitled "FLEXIBLE BEAMFORMING TECHNIQUES FOR WIRELESS DEVICES," filed Dec. 14, 2018, assigned to the assignee hereof, and expressly incorporated by reference in its entirety herein.

INTRODUCTION

The following relates generally to wireless communications, and more specifically to beamforming techniques for wireless devices.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method of wireless communications at a UE having one or more foldable units is described. The method may include identifying foldable state capability information of the UE, the foldable state capability information corresponding to a state of the one or more foldable units, transmitting an indication of the foldable state capability information to a base station in communications with the UE, and performing a beamforming communication between the base station and the UE based on the foldable state capability information.

An apparatus for wireless communications at a UE having one or more foldable units is described. The apparatus may include a processor, memory coupled to the processor, and instructions stored in the memory. The instructions may be executable by the processor to cause the apparatus to identify foldable state capability information of the UE, the foldable state capability information corresponding to a state of the one or more foldable units, transmit an indication of the foldable state capability information to a base station in communications with the UE, and perform a beamforming communication between the base station and the UE based on the foldable state capability information.

Another apparatus for wireless communications at a UE having one or more foldable units is described. The apparatus may include means for identifying foldable state capability information of the UE, the foldable state capability information corresponding to a state of the one or more foldable units, transmitting an indication of the foldable state capability information to a base station in communications with the UE, and performing a beamforming communication between the base station and the UE based on the foldable state capability information.

A non-transitory computer-readable medium storing code for wireless communications at a UE having one or more foldable units is described. The code may include instructions executable by a processor to identify foldable state capability information of the UE, the foldable state capability information corresponding to a state of the one or more foldable units, transmit an indication of the foldable state capability information to a base station in communications with the UE, and perform a beamforming communication between the base station and the UE based on the foldable state capability information.

Some examples of the method, apparatuses, and non-transitory computer-readable medium described herein may further include operations, features, means, or instructions for determining a number of independently foldable units of the one or more foldable units of the UE, and transmitting the number of the independently foldable units in the foldable state capability information to the base station.

Some examples of the method, apparatuses, and non-transitory computer-readable medium described herein may further include operations, features, means, or instructions for determining angle information associated with the one or more foldable units, and transmitting the angle information associated with the one or more foldable units in the foldable state capability information.

In some examples of the method, apparatuses, and non-transitory computer-readable medium described herein, determining the angle information may include operations, features, means, or instructions for identifying an angle separation between a first antenna array of a first foldable unit of the one or more foldable units and a second antenna array of a second foldable unit of the one or more foldable units.

In some examples of the method, apparatuses, and non-transitory computer-readable medium described herein, determining the angle information may include operations, features, means, or instructions for obtaining relative positioning information from one or more sensors of the UE with respect to a reference direction, and determining an angle between two or more antenna arrays of the one or more foldable units based on the relative positioning information.

Some examples of the method, apparatuses, and non-transitory computer-readable medium described herein may further include operations, features, means, or instructions for receiving the beamformed communication according to a beamwidth used by the base station based on the foldable state capability information, and adjusting a beamwidth used by the UE based on the beamwidth used by the base station.

Some examples of the method, apparatuses, and non-transitory computer-readable medium described herein may further include operations, features, means, or instructions for determining a foldable state of the UE based on the one or more foldable units, and transmitting an indication of the foldable state in the foldable state capability information.

In some examples of the method, apparatuses, and non-transitory computer-readable medium described herein, the foldable state of the UE includes a single quantized state from a set of quantized states associated with the UE.

In some examples of the method, apparatuses, and non-transitory computer-readable medium described herein, the foldable state of the UE includes an indication for one of a folded state, one or more partially open states, a fully open state, or a flat state.

In some examples of the method, apparatuses, and non-transitory computer-readable medium described herein, the foldable state of the UE may be associated with a 0 degree angle, a 90 degree angle, a 180 degree angle, or an intermediate angle between two or more of the one or more foldable units.

Some examples of the method, apparatuses, and non-transitory computer-readable medium described herein may further include operations, features, means, or instructions for including the indication of the foldable state capability information in a UE capability message.

In some examples of the method, apparatuses, and non-transitory computer-readable medium described herein, performing the beamforming communication may include operations, features, means, or instructions for configuring a set of receive antenna arrays of the UE based on the foldable state capability information, and receiving a beamformed signal from the base station via the configured set of receive antenna arrays.

In some examples of the method, apparatuses, and non-transitory computer-readable medium described herein, performing the beamforming communication may include operations, features, means, or instructions for configuring a set of transmit antenna arrays of the UE based on the foldable state capability information, and transmitting a beamformed signal to the base station via the configured set of transmit antenna arrays.

A method of wireless communications at a base station is described. The method may include receiving, from a UE, an indication of foldable state capability information of the UE, the foldable state capability information corresponding to a state of the one or more foldable units of the UE, determining a beamforming parameter for beamforming communications with the UE based on the foldable state capability information, and performing a beamforming communication with the UE based on the beamforming parameter.

An apparatus for wireless communications at a base station is described. The apparatus may include a processor, memory coupled to the processor, and instructions stored in the memory. The instructions may be executable by the processor to cause the apparatus to receive, from a UE, an indication of foldable state capability information of the UE, the foldable state capability information corresponding to a state of the one or more foldable units of the UE, determine a beamforming parameter for beamforming communications with the UE based on the foldable state capability information, and perform a beamforming communication with the UE based on the beamforming parameter.

Another apparatus for wireless communications at a base station is described. The apparatus may include means for receiving, from a UE, an indication of foldable state capability information of the UE, the foldable state capability information corresponding to a state of the one or more foldable units of the UE, determining a beamforming parameter for beamforming communications with the UE based on the foldable state capability information, and performing a beamforming communication with the UE based on the beamforming parameter.

A non-transitory computer-readable medium storing code for wireless communications at a base station is described. The code may include instructions executable by a processor to receive, from a UE, an indication of foldable state capability information of the UE, the foldable state capability information corresponding to a state of the one or more foldable units of the UE, determine a beamforming parameter for beamforming communications with the UE based on the foldable state capability information, and perform a beamforming communication with the UE based on the beamforming parameter.

In some examples of the method, apparatuses, and non-transitory computer-readable medium described herein, the one or more foldable units may include a rollable folding display or an extendable display.

In some examples of the method, apparatuses, and non-transitory computer-readable medium described herein, determining the beamforming parameter may include operations, features, means, or instructions for determining a periodicity for a set of reference signals of a beam training process for the UE, and transmitting an indication of the periodicity for the set of reference signals to of the beam training process to the UE.

In some examples of the method, apparatuses, and non-transitory computer-readable medium described herein, determining the periodicity may include operations, features, means, or instructions for increasing or decreasing the periodicity of the set of reference signals with respect to a current or previous periodicity of the set of reference signals.

In some examples of the method, apparatuses, and non-transitory computer-readable medium described herein, the set of reference signals includes a set of channel state information reference signals (CSI-RSs).

In some examples of the method, apparatuses, and non-transitory computer-readable medium described herein, the indication of the periodicity may be transmitted to the UE via a downlink control channel.

In some examples of the method, apparatuses, and non-transitory computer-readable medium described herein, determining the beamforming parameter may include operations, features, means, or instructions for determining a set of beam indices or a number of beams for use at the UE in beamforming communications with the UE, where determining the number of beams comprises determining a hierarchy of the number of beams, and transmitting an indication of the set of beam indices or the number of beams to the UE.

In some examples of the method, apparatuses, and non-transitory computer-readable medium described herein, determining the beamforming parameter may include operations, features, means, or instructions for determining a beamwidth of a beam for use at the UE in beamforming communications with the UE, and transmitting an indication of the beamwidth of the beam to the UE.

Some examples of the method, apparatuses, and non-transitory computer-readable medium described herein may further include operations, features, means, or instructions for determining a set of beam indices for use at the base station in beamforming communications with the UE, where the beamforming communication may be performed based on the set of beam indices or the number of beams, where the determination of the number of beams comprises determining a hierarchy of the number of beams, and adjusting a codebook associated with the number of beams, the beam indices, or the hierarchy of the number of beams, or a combination thereof.

Some examples of the method, apparatuses, and non-transitory computer-readable medium described herein may further include operations, features, means, or instructions for determining a beamwidth of a beam for use at the base station in beamforming communications with the UE, where the beamforming communication may be performed based on the beamwidth, and adjusting a codebook associated with the beamforming of the beam.

Some examples of the method, apparatuses, and non-transitory computer-readable medium described herein may further include operations, features, means, or instructions for receiving the beamformed communication from the UE according to a beamwidth used by the UE, where the beamwidth for use by the base station may be determined based on the beamwidth used by the UE.

In some examples of the method, apparatuses, and non-transitory computer-readable medium described herein, determining the beamforming parameter may include operations, features, means, or instructions for determining a transmit power for at least one beam for beamforming communications with the UE.

Some examples of the method, apparatuses, and non-transitory computer-readable medium described herein may further include operations, features, means, or instructions for determining respective transmit powers for each of a set of beams for beamforming communications with the UE.

In some examples of the method, apparatuses, and non-transitory computer-readable medium described herein, performing the beamforming communication with the UE may include operations, features, means, or instructions for transmitting the beamforming communication via the at least one beam in accordance with the transmit power.

A method of wireless communications at a UE having multiple antenna arrays is described. The method may include identifying antenna array information of the UE, the antenna array information corresponding to the multiple antenna arrays, transmitting an indication of the antenna array information to a base station in communication with the UE, and performing a beamforming communication with the base station based on the antenna array information.

An apparatus for wireless communications at a UE having multiple antenna arrays is described. The apparatus may include a processor, memory coupled to the processor, and instructions stored in the memory. The instructions may be executable by the processor to cause the apparatus to identify antenna array information of the UE, the antenna array information corresponding to the multiple antenna arrays, transmit an indication of the antenna array information to a base station in communication with the UE, and perform a beamforming communication with the base station based on the antenna array information.

Another apparatus for wireless communications at a UE having multiple antenna arrays is described. The apparatus may include means for identifying antenna array information of the UE, the antenna array information corresponding to the multiple antenna arrays, transmitting an indication of the antenna array information to a base station in communication with the UE, and performing a beamforming communication with the base station based on the antenna array information.

A non-transitory computer-readable medium storing code for wireless communications at a UE having multiple antenna arrays is described. The code may include instructions executable by a processor to identify antenna array information of the UE, the antenna array information corresponding to the multiple antenna arrays, transmit an indication of the antenna array information to a base station in communication with the UE, and perform a beamforming communication with the base station based on the antenna array information.

Some examples of the method, apparatuses, and non-transitory computer-readable medium described herein may further include operations, features, means, or instructions for identifying a set of active antenna arrays for beamforming communications with the base station, and transmitting an indication of the set of active antenna arrays in the antenna array information.

A method of wireless communications at a base station is described. The method may include receiving, from a UE, an indication of antenna array information of the UE, the antenna array information corresponding to multiple antenna arrays of the UE, determining a beamforming parameter for beamforming communications with the UE based on the antenna array information, and performing a beamforming communication with the UE based on the beamforming parameter.

An apparatus for wireless communications at a base station is described. The apparatus may include a processor, memory coupled to the processor, and instructions stored in the memory. The instructions may be executable by the processor to cause the apparatus to receive, from a UE, an indication of antenna array information of the UE, the antenna array information corresponding to multiple antenna arrays of the UE, determine a beamforming parameter for beamforming communications with the UE based on the antenna array information, and perform a beamforming communication with the UE based on the beamforming parameter.

Another apparatus for wireless communications at a base station is described. The apparatus may include means for receiving, from a UE, an indication of antenna array information of the UE, the antenna array information corresponding to multiple antenna arrays of the UE, determining a beamforming parameter for beamforming communications with the UE based on the antenna array information, and performing a beamforming communication with the UE based on the beamforming parameter.

A non-transitory computer-readable medium storing code for wireless communications at a base station is described. The code may include instructions executable by a processor to receive, from a UE, an indication of antenna array information of the UE, the antenna array information corresponding to multiple antenna arrays of the UE, determine a beamforming parameter for beamforming communications with the UE based on the antenna array information, and perform a beamforming communication with the UE based on the beamforming parameter.

Some examples of the method, apparatuses, and non-transitory computer-readable medium described herein may further include operations, features, means, or instructions for identifying a set of active antenna arrays of the UE for beamforming communications based on the antenna array information, and determining the beamforming parameter based on the set of active antenna arrays.

DETAILED DESCRIPTION

Figure 1:
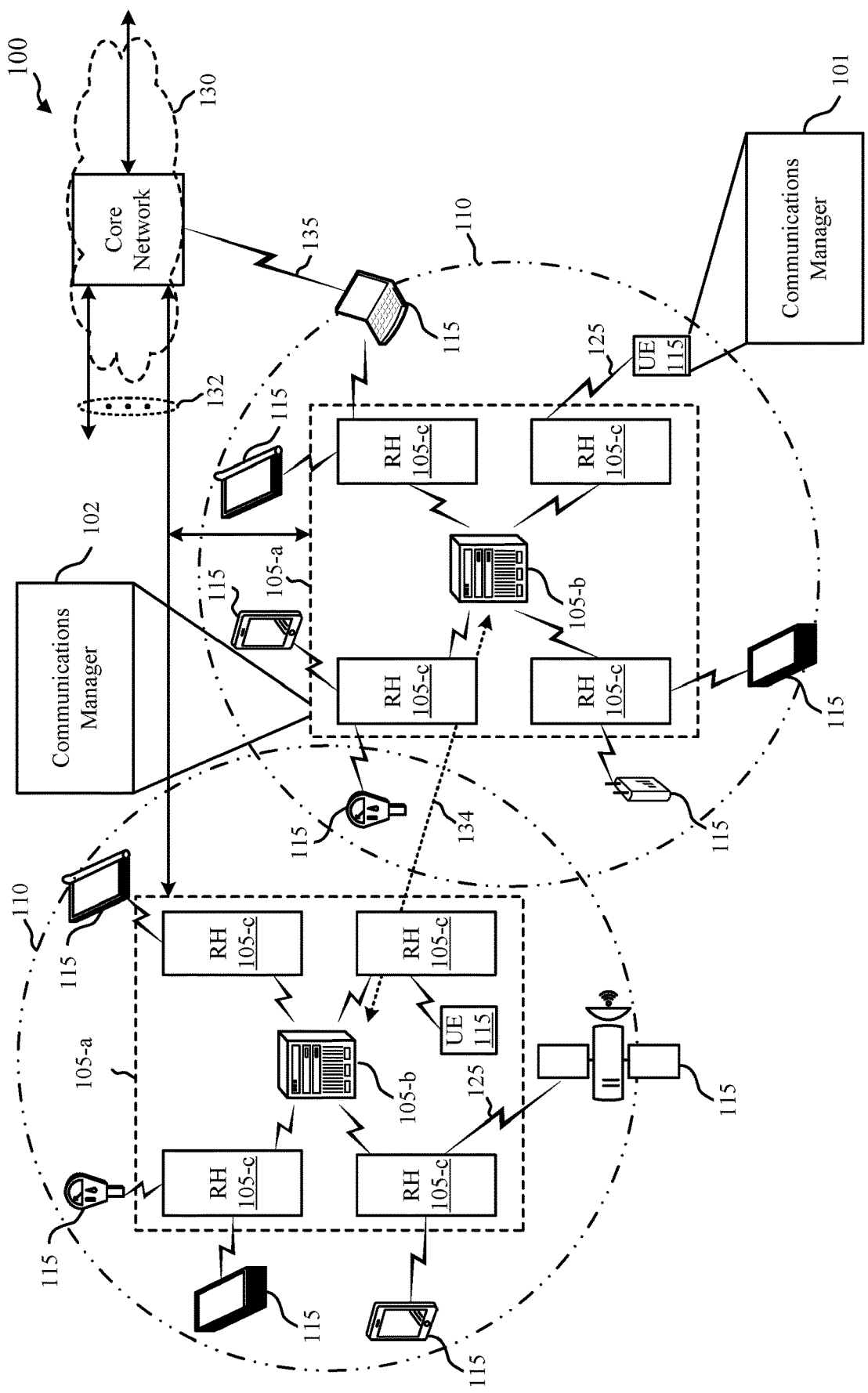
FIG. 1 illustrates an example of a wireless communications system that supports flexible beamforming techniques for wireless devices in accordance with one or more aspects of the present disclosure.

Some UEs may be designed with foldable displays. While form factor and cost considerations result in most UEs having a non-foldable display, as design complexity has decreased, UEs with foldable displays have gained increasing traction. UEs with foldable displays may present new challenges in wireless communications. For example, depending on a configuration of the foldable displays of a UE, traditional techniques may need to be enhanced for improving beamforming communications between the UE and other wireless devices (e.g., a base station).

A wireless device such as a UE may include multiple antenna modules each with multiple antenna arrays used to support communications between the UE and other wireless devices (e.g., a base station). The multiple antenna arrays may each include a set of antenna elements, each of which may be separately or jointly configured to transmit or receive wireless signals. The multiple antenna arrays may be located or positioned at different parts or along different portions of the UE and may allow the UE to flexibly perform beamforming communications.

When performing communications, the multiple antenna arrays may be configured individually or jointly as antenna sets or groups, and the size of each antenna set or group including the number of antenna arrays in the antenna set or group may vary based on the configuration of the UE. For example, a UE may include a foldable display having multiple independent foldable display units, and the communication parameters used for transmission and reception of signals via the multiple antenna arrays (or a portion of the multiple antenna arrays) may depend on the configuration of the multiple independent foldable display units. In some aspects, a state of the multiple foldable display units (e.g., a closed state, a partially open state, a fully open state) or the arrangement of the multiple antenna arrays relative to one another may be used to configure and perform beamforming communications between the UE and a base station.

In some cases, the UE may transmit foldable state capability information or antenna array information to a base station, including which antenna arrays or sets or groups are available for a beam training process, a relative angle between the antenna arrays, the number of antenna arrays in each antenna set or group, or the number of independent foldable display units, among others. The base station may adapt a beam training process based on the foldable state capability information or antenna array information from the UE. For instance, the base station may train each of the antenna sets or groups independently to speed up the beam training process. Additionally or alternatively, the base station may suggest, to the UE, specific beam indices (e.g., in specific directions) or beamwidths based on the foldable state capability information or the antenna array information. In some aspects, the base station may modify the beamwidths used by the base station for beamforming communications with the UE based on the suggestions to the UE, the foldable state capability information, or the antenna array information (e.g., to capture cluster gains from the antenna sets).

Aspects of the disclosure are initially described in the context of wireless communications systems. Aspects are then described with respect to device configurations and process flows. Aspects of the disclosure are further illustrated by and described with reference to apparatus diagrams, system diagrams, and flowcharts that relate to flexible beamforming techniques for wireless devices.

FIG. 1 illustrates an example of a wireless communications system 100 that supports flexible beamforming techniques for wireless devices in accordance with one or more aspects of the present disclosure. The wireless communications system 100 includes network devices 105, UEs 115, and a core network 130. In some examples, the wireless communications system 100 may be an LTE network, an LTE-A network, an LTE-A Pro network, or an NR network. In some cases, wireless communications system 100 may support enhanced broadband communications, ultra-reliable (e.g., mission critical) communications, low latency communications, or communications with low-cost and low-complexity devices.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by network devices 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices 105 (e.g., network device 105-a), which may be an example of a base station (e.g., eNB, network access devices, gNB), or network device 105-b, which may be an example of an access node controller (ANC)), may interface with the core network 130 through backhaul links 132 (e.g., S1, S2) and may perform radio configuration and scheduling for communication with the UEs 115. In various examples, the network devices 105-b may communicate, either directly or indirectly (e.g., through core network 130), with each other over backhaul links 134 (e.g., X1, X2), which may be wired or wireless communication links.

Each network device 105-b may also additionally or alternatively communicate with a number of UEs 115 through a number of other network devices 105-c, where network device 105-c may be an example of a smart radio head (or through a number of smart radio heads). In alternative configurations, various functions of each network device 105 may be distributed across various network devices 105 (e.g., radio heads and access network controllers) or consolidated into a single network device 105 (e.g., a base station).

Network device 105 may wirelessly communicate with UEs 115 via one or more base station antennas. Network device 105 described herein may include or may be referred to by those skilled in the art as a base transceiver station, a radio base station, an access point, a radio transceiver, a NodeB, an eNodeB (eNB), a 5G or a next-generation NodeB or giga-NodeB (either of which may be referred to as a gNB), a Home NodeB, a Home eNodeB, or some other suitable terminology. Wireless communications system 100 may include network devices 105 of different types (e.g., macro or small cell base stations). The UEs 115 described herein may be able to communicate with various types of network devices 105 and network equipment including macro eNBs, small cell eNBs, gNBs, relay base stations, and the like.

Each network device 105 may be associated with a particular geographic coverage area 110 in which communications with various UEs 115 is supported. Each network device 105 may provide communication coverage for a respective geographic coverage area 110 via communication links 125, and communication links 125 between a network device 105 and a UE 115 may utilize one or more carriers. Communication links 125 shown in wireless communications system 100 may include uplink transmissions from a UE 115 to a network device 105, or downlink transmissions from a network device 105 to a UE 115. Downlink transmissions may also be called forward link transmissions while uplink transmissions may also be called reverse link transmissions.

The geographic coverage area 110 for a network device 105 may be divided into sectors making up only a portion of the geographic coverage area 110, and each sector may be associated with a cell. For example, each network device 105 may provide communication coverage for a macro cell, a small cell, a hot spot, or other types of cells, or various combinations thereof. In some examples, a network device 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same network device 105 or by different network devices 105. The wireless communications system 100 may include, for example, a heterogeneous LTE/LTE-A/LTE-A Pro or NR network in which different types of network devices 105 provide coverage for various geographic coverage areas 110.

The term "cell" refers to a logical communication entity used for communication with a network device 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. Additionally, as described herein, a UE 115 may be a flexible wireless device with a foldable display. For example, a UE 115 may have multiple independent foldable display units, flexible displays, bendable displays, rollable displays, or other unique form factors. As used herein, the descriptors "foldable display", "flexible display", "bendable display", and "rollable display" may be used interchangeably, where each of the descriptors relates to a UE 115 that includes one or more antenna arrays that can change based on an adjustable physical configuration of the UE 115. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like. A UE 115 may communicate with the core network 130 through communication link 135.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a network device 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a network device 105. Other UEs 115 in such a group may be outside the geographic coverage area 110 of a network device 105, or be otherwise unable to receive transmissions from a network device 105. In some cases, groups of UEs 115 communicating via D2D communications may utilize a one-to-many (1:M) system in which each UE 115 transmits to every other UE 115 in the group. In some cases, a network device 105 facilitates the scheduling of resources for D2D communications. In other cases, D2D communications are carried out between UEs 115 without the involvement of a network device 105.

Network devices 105 may communicate with the core network 130 and with one another. For example, network devices 105 may interface with the core network 130 through backhaul links 132 (e.g., via an S1, N2, N3, or other interface). Network devices 105 may communicate with one another over backhaul links 134 (e.g., via an X2, Xn, or other interface) either directly (e.g., directly between network devices 105) or indirectly (e.g., via core network 130).

The core network 130 may provide user authentication, access authorization, tracking, IP connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by network devices 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a network device 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (which may be known as a transmission reception point (TRP); however, in the present disclosure, TRP will be assumed to stand for total radiated power unless otherwise specified). In some configurations, various functions of each access network entity or network device 105 may be distributed across various network devices (e.g., radio heads and access network controllers) or consolidated into a single network device (e.g., a network device 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and network devices 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as network devices 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, network device 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a network device 105) and a receiving device (e.g., a UE 115), where the transmitting device is equipped with multiple antennas and the receiving devices are equipped with one or more antennas.

MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a network device 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a network device 105 may use multiple antennas or antenna arrays to conduct beamforming operations for directional communications with a UE 115. For instance, some signals (e.g., synchronization signals, reference signals, beam selection signals, or other control signals) may be transmitted by a network device 105 multiple times in different directions, which may include a signal being transmitted according to different beamforming weight sets associated with different directions of transmission. Transmissions in different beam directions may be used to identify (e.g., by the network device 105 or a receiving device, such as a UE 115) a beam direction for subsequent transmission or reception by the network device 105.

Some signals, such as data signals associated with a particular receiving device, may be transmitted by a network device 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the network device 105 in different directions, and the UE 115 may report to the network device 105 an indication of the signal it received with a highest signal quality, or an otherwise acceptable signal quality. Although these techniques are described with reference to signals transmitted in one or more directions by a network device 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the network device 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a network device 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a network device 105 may be located in diverse geographic locations. A network device 105 may have an antenna array with a number of rows and columns of antenna ports that the network device 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a network device 105 or core network 130 supporting radio bearers for user plane data. At the Physical layer, transport channels may be mapped to physical channels.

In some cases, UEs 115 and network devices 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected CCs using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a network device 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or DFT-s-OFDM).

The organizational structure of the carriers may be different for different radio access technologies (LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a CA configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., network devices 105 or UEs 115) may have a hardware configuration that supports communications over a particular carrier bandwidth, or may be configurable to support communications over one of a set of carrier bandwidths. In some examples, the wireless communications system 100 may include network devices 105 or UEs 115 that can support simultaneous communications via carriers associated with more than one different carrier bandwidth.

Wireless communications system 100 may support communication with a UE 115 on multiple cells or carriers, a feature which may be referred to as CA configuration or multi-carrier operation. A UE 115 may be configured with multiple downlink CCs and one or more uplink CCs according to a CA configuration. CA may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or network device 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a UE 115 may have multiple antenna arrays for wireless communication between the UE 115 and other wireless devices (e.g., a network device 105). Additionally or alternatively, the UE 115 may include a foldable display with multiple foldable display units. In some cases, the foldable display may be a rollable or extendable display. Currently, there is no mechanism in place for the UE 115 to indicate to other wireless devices configurations of the multiple antenna arrays or multiple foldable display units. Indicating these configurations may allow the UE to flexibly perform beamforming communications with other wireless devices based on the configurations.

A UE 115 may include a communications manager 101 for managing wireless communications with other wireless devices. Communications manager 101 may allow the UE 115 to determine antenna array information corresponding to the configuration of the multiple antenna arrays. Additionally or alternatively, communications manager 101 may allow the UE 115 to determine foldable state capability information corresponding to the configuration of the multiple foldable display units. UE 115 may transmit the antenna array information or the foldable state capability information to other wireless devices via communications manager 101. UE 115 may perform beamforming communications with other wireless devices via communications manager 101 based on the antenna array information or the foldable state capability information.

A network device 105 may include a communications manager 102 for managing wireless communications with other wireless devices. Communications manager 102 may allow the network device 105 to receive from the UE 115 antenna array information corresponding to the configuration of the multiple antenna arrays of the UE 115. Additionally or alternatively, communications manager 102 may allow the network device 105 to receive from the UE 115 foldable state capability information corresponding to the configuration of the multiple foldable display units of the UE 115. Network device 105 may determine, via communications manager 102, a beamforming parameter for beamforming communications based on the received antenna array information or the received foldable state capability information. Network device 105 may perform beamforming communications with UE 115 via communications manager 102 based on the beamforming parameter.

Figure 2:
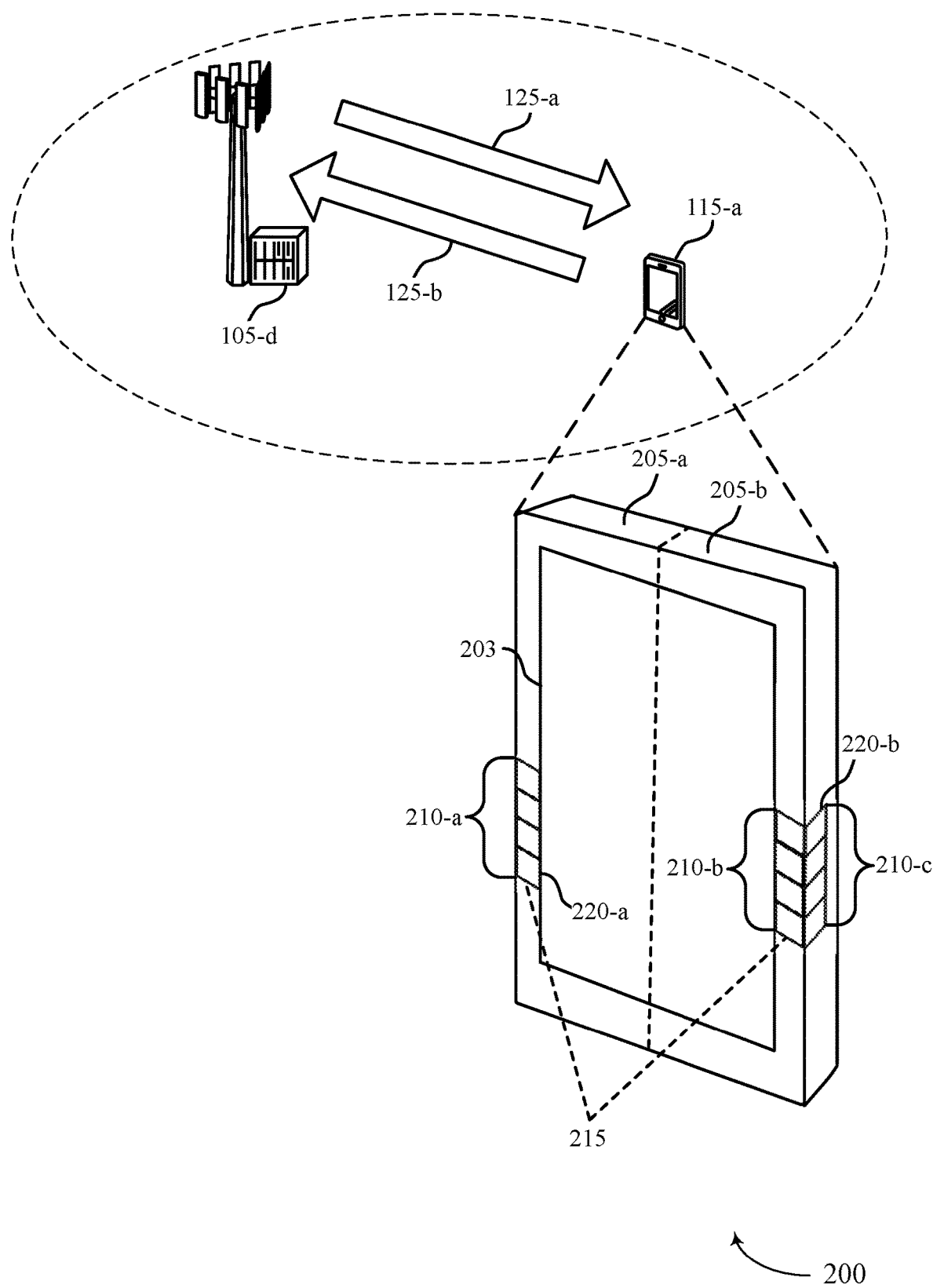
FIG. 2 illustrates an example of a wireless communications system that supports flexible beamforming techniques for wireless devices in accordance with one or more aspects of the present disclosure.

FIG. 2 illustrates an example of a wireless communication system 200 that supports flexible beamforming techniques for wireless devices in accordance with one or more aspects of the present disclosure. In some examples, wireless communication system 200 may implement aspects of wireless communications system 100. As shown, wireless communications system 200 includes UE 115-a and base station 105-d, which may be respective examples of a UE 115 and a network device 105 as described herein. In some examples, UE 115-a may employ beamforming techniques for communications with the base station 105-d (e.g., to facilitate data transfer with a high data rate). Additionally or alternatively, UE 115-a may communicate with base station 105-d using frequencies greater than 24 GHz. UE 115-a may communicate with base station 105-d over communication links 125-a and 125-b, which may be examples of communication links 125 as described herein.

In some aspects, UE 115-a may be a device having a foldable display 203. In some cases, foldable display 203 may be a rollable or extendable display. Additionally or alternatively, foldable display 203 may include one or multiple independent foldable units 205. The one or more independent foldable units 205 may allow the UE 115-a to operate in a variety of form factors based on a configuration of the foldable units 205. In some examples, the form factors may include a mobile phone, a tablet, a book, a laptop computer, a large display such as an extended reality (XR) device, or the like. The one or more foldable units 205 may also include multiple foldable units.

One or more antenna arrays 210 may be positioned in various locations about UE 115-a to allow flexible beamforming communication. UE 115-a may configure the one or more antenna arrays 210 into configured antenna sets 215, which may operate as an independent antenna module. Alternatively, each antenna array 210 or each antenna element 220 of each antenna array 210 may be configured individually for beamforming communications. In some examples, the number of configured antenna sets 215 may be based on a configuration of the foldable units 205.

UE 115-a may determine a foldable state of UE 115-a based on the configuration of foldable units 205 and may adjust a type or nature of beamforming communication based on the foldable state of UE 115-a. In some examples, the UE 115-a may adjust the number of configured antenna sets 215, which of the one or more antenna arrays 210 are included in each of the configured antenna sets 215, or a number of active antenna arrays 210 or antenna elements 220. In some examples, the UE 115-a may adjust codebooks associated with the beamforming communication, a number of beams associated with the beamforming communication, a beamwidth of a beam associated with the beamforming communication, hierarchies in the beamforming communication, among others.

In some examples, each of the one or more antenna arrays 210 may be associated with a respective foldable unit 205. For example, antenna array 210-a may be positioned on or within foldable unit 205-a, while antenna arrays 210-b and 210-c may be position on or within foldable unit 205-b. Each of the one or more antenna arrays 210 may be configured as a receive or transmit antenna array. In some cases, the one or more antenna arrays 210 of each configured antenna set 215 may point in the same direction. Additionally or alternatively, the one or more antenna arrays 210 of each configured antenna set 215 may be co-phased.

In some examples, the foldable display 203 may include two independently foldable units 205. UE 115-a may determine angle information associated with the two foldable units 205. UE 115-a may determine the angle information based on an angle separation between two antenna arrays 210 where each of the two antenna arrays is associated with a different independently foldable unit 205. The angle separation may have a value $\varphi$ between 0° and 180°. UE 115-a may perform beamforming communications via a number of configured antenna sets 215, where the number of configured antenna sets may be based on the angle separation between antenna arrays. In some examples, such as when the angle separation has a value $\varphi$ other than 0°, 90°, or 180°, UE 115-a may perform beamforming communication via a first number of configured antenna sets 215 (e.g., 4 configured antenna sets 215) across different parts of UE 115-a. This may be referred to as angle separation.

UE 115-a may transmit foldable state capability information based on the foldable state of UE 115-a. UE 115-a may transmit the foldable state capability information to base station 105-d over communication link 125-b. UE 115-a may transmit the foldable state capability information in a beamformed signal via a configured antenna set 215 of transmit antenna arrays. In some examples, UE 115-a may transmit the foldable state capability information in a UE capability message. The foldable state capability information may include one or more of: a number of independent foldable units 205 that make up the UE 115-a, the number of configured antenna sets 215, a number of antenna arrays 210 or antenna elements 220 that make up each configured antenna set 215, relative angles between the configured antenna sets 215 in the foldable state, state information based on the foldable state of UE 115-a, feedback indicating one or more of the configured antenna sets 215 may be blocked (e.g., by a hand, a body, a vehicle, buildings, based on the device configuration, etc.), or other foldable state capability information. In some cases, the relative angles between the configured antenna sets 215 may be based on angle information obtained from internal sensors (e.g., gyros). The state information may include a type of the foldable state of UE 115-a. Some examples of the type of the foldable state may include the unfolded state, a small form factor construction, a large form factor construction, and other types of the foldable state. In some examples, the state information may be quantized to include a number of supported foldable states. In some cases, the quantized states may include a folded state, a flat state, one or more partially open states, and a fully open state.

Base station 105-d may receive the foldable state capability information based on the foldable state of UE 115-a. Base station 105-d may determine a beamforming parameter for beamforming communications with UE 115-a based on the received foldable state capability information. Base station 105-d may adapt signaling based on the beamforming parameter. In some cases, base station 105-d may selectively train the configured antenna sets 215, which may speed up a beam training process.

In some examples, base station 105-d may determine a periodicity for a set of reference signals of a beam training process for UE 115-a. Base station 105-d may transmit an indication of the periodicity for the set of reference signals of the beam training process to UE 115-a over communication link 125-a. Base station 105-d may transmit the indication of the periodicity via a downlink control channel. In some examples, base station 105-d may increase or decrease the periodicity of the set of reference signals with respect to a current or previous periodicity of the set of reference signals. In some examples, base station 105-d may increase or decrease the periodicity of the set of reference signals based on the received foldable state capability information. Base station 105-d may increase or decrease the periodicity based on the number of configured antenna sets 215, or the number of antenna arrays 210 that make up each configured antenna set 215, identified in the received foldable state capability information. In some cases, the set of reference signals may include a set of CSI-RSs. In some examples, base station 105-d may decrease the periodicity of CSI-RS transmissions (e.g., more frequent CSI-RS transmissions) when the foldable state capability information indicates a larger number of antenna arrays 210 contained in one or more of the configured antenna sets 215. The decreased periodicity of CSI-RS transmissions may accommodate an increased number of beams in a codebook, which may correspond to better transmission gains.

In some examples, base station 105-d may suggest one or more beam choices to UE 115-a based on the received foldable state capability information. Base station 105-d may form a long term statistical map of a channel based on the received information from the UE such as beam indices, reference signal received power (RSRP) levels, among others. Base station 105-d may suggest the one or more beam choices to UE 115-a based on the relative angles between the configured antenna sets 215 contained in the received foldable state capability information and the long term statistical map of the channel. In some examples, the suggested beam choices may be oriented in specific directions toward dominant clusters of the configured antenna sets 215. In some cases, the suggested beam choices may include a set of beam indices. Additionally or alternatively, the suggested beam choices may be based on a RSRP measurement. Additionally or alternatively, the suggested beam choices may be based on a prior beam training session. If the foldable state capability information indicates a different number (e.g., a larger number) of antenna arrays 210 contained in one or more of the configured antenna sets 215 with respect to the prior beam training session, base station 105-d may suggest appropriate (e.g., reduced) beamwidths to UE 115-a based on channel statistical properties as part of the suggested beam choices. In some examples, base station 105-d may adjust beamwidths used at its end to capture cluster gains based on the appropriate beamwidths suggested to UE 115-a. Additionally or alternatively, base station 105-d may determine a transmit power or effective isotropic radiated power (EIRP) for at least one beam for beamforming communications with UE 115-a. Base station 105-d may adjust the transmit power for a set of beams beamforming communications with UE 115-a based on the received foldable state capability information. Base station 105-d may see increased array gains based on the one or more antenna arrays 210 of each configured antenna set 215 pointing in the same direction or being co-phased.

UE 115-a may receive signaling from base station 105-d based on the transmitted foldable state capability information. UE 115-a may receive the signaling from base station 105-d over communication link 125-a. UE 115-a may receive the signaling in a beamformed signal via a configured antenna set 215 of receive antenna arrays. UE 115-a may adjust or refine beamforming communications based on the received signaling. In some cases, UE 115-a may adjust or refine beamforming communications by modifying one or more of: a number of antenna elements 220 used, a number of antenna arrays 210 used, a transmit power for at least one beam, a beam index, and a beamwidth.

In some cases, UE 115-a may include a non-foldable display and may include multiple antenna arrays 210. In such instances, UE 115-a may identify antenna array information for one or more antenna arrays 210. UE 115-a may transmit antenna array information (e.g., number of active antenna arrays 210, angle between antenna arrays 210) to base station 105-d over communication link 125-b. In some examples, UE 115-a may identify a set of active antenna arrays 210 for beamforming communication with base station 105-d. UE 115-a may transmit an indication of the set of active arrays 210 to base station 105-d over communication link 125-b. UE 115-a may perform a beamforming communication with base station 105-d based on the transmitted antenna array information.

Base station 105-d may receive the antenna array information from UE 115-a over communication link 125-b. Base station 105-d may determine a beamforming parameter based on the received antenna array information. Base station 105-d may perform a beamforming communication with UE 115-a based on the determined beamforming parameter. In some cases, base station 105-d may identify the set of active antenna arrays 210 based on the received antenna array information. Additionally or alternatively, base station 105-d may determine the beamforming parameter based on the set of active antenna arrays 210.

Figure 3:
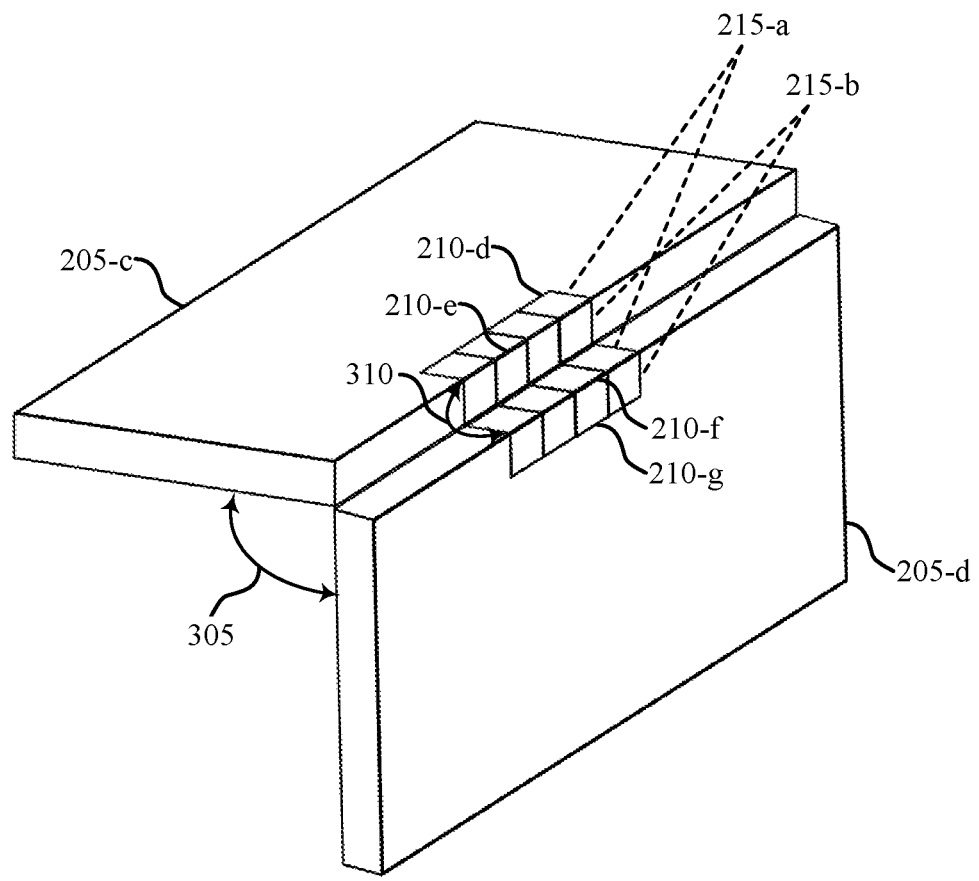
FIG. 3 illustrates an example of a device configuration that supports flexible beamforming techniques for wireless devices in accordance with one or more aspects of the present disclosure.

FIG. 3 illustrates an example of a device configuration 300 that supports flexible beamforming techniques for wireless devices in accordance with one or more aspects of the present disclosure. In some examples, device configuration 300 may implement aspects of wireless communications systems 100 or 200. Device configuration 300 may be a configuration of a UE 115 as described herein.

UE 115 may include a foldable display with foldable units 205-c and 205-d. Antenna arrays 210-d and 210-e may be associated with foldable unit 205-c, and antenna arrays 210-f and 210-g may be associated with foldable unit 205-d. UE 115 may include additional antenna arrays 210 (not shown), including one or more antenna arrays 210 that may be blocked or otherwise unable to transmit or receive based on the device configuration of UE 115. Each of antenna arrays 210-d, 210-e, 210-f, and 210-g may be a receive antenna array, a transmit antenna array, or both. Foldable units 205-c and 205-d may be associated with angle information 305. In some examples, UE 115 may identify the angle information 305 based on an angle separation 310, which may identify the angle separation between antenna arrays 210-d and 210-g or between antenna arrays 210-e and 210-f. Additionally or alternatively, UE 115 may identify the angle information 305 based on relative positioning information from one or more sensors of UE 115 with respect to a reference direction. The angle separation 310 may have a value $\varphi=90°$. UE 115 may determine that UE 115 is in a partially open state based on the angle separation 310.

UE 115 may configure antenna arrays 210-d, 210-e, 210-f, and 210-g into configured antenna sets 215-a and 215-b. UE 115 may perform beamforming communication via configured antenna sets 215-a and 215-b. Configured antenna set 215-a may include antenna arrays 210-d and 210-f, and configured antenna set 215-b may include antenna arrays 210-e and 210-e. In some cases, antenna arrays 210-d and 210-f may point in a first direction, and antenna arrays 210-e and 210-g may point in a second direction. Additionally or alternatively, antenna arrays 210-d and 210-f may be co-phased, and antenna arrays 210-e and 210-g may be co-phased.

UE 115 may transmit foldable state capability information to base station 105 based on determining that UE 115 is in an open or partially open state. UE 115 may transmit the foldable state capability information in a beamformed signal via one or more of configured antenna sets 215-a and 215-b. In some examples, UE 115 may transmit the foldable state capability information in a UE capability message. In some cases, the foldable state capability information may include feedback indicating one or more of the configured antenna sets 215 may be blocked based on the device configuration of UE 115.

UE 115 may receive signaling from base station 105 based on the transmitted foldable state capability information. UE 115 may receive the signaling in a beamformed signal via one or more of configured antenna sets 215-a and 215-b. UE 115 may adjust or refine the beamforming communication based on the received signaling. In some cases, UE 115 may adjust or refine beamforming communications by modifying one or more of: a number of antenna elements 220 used, a number of antenna arrays 210 used, a transmit power for at least one beam, a beam index, and a beamwidth.

Figure 4:
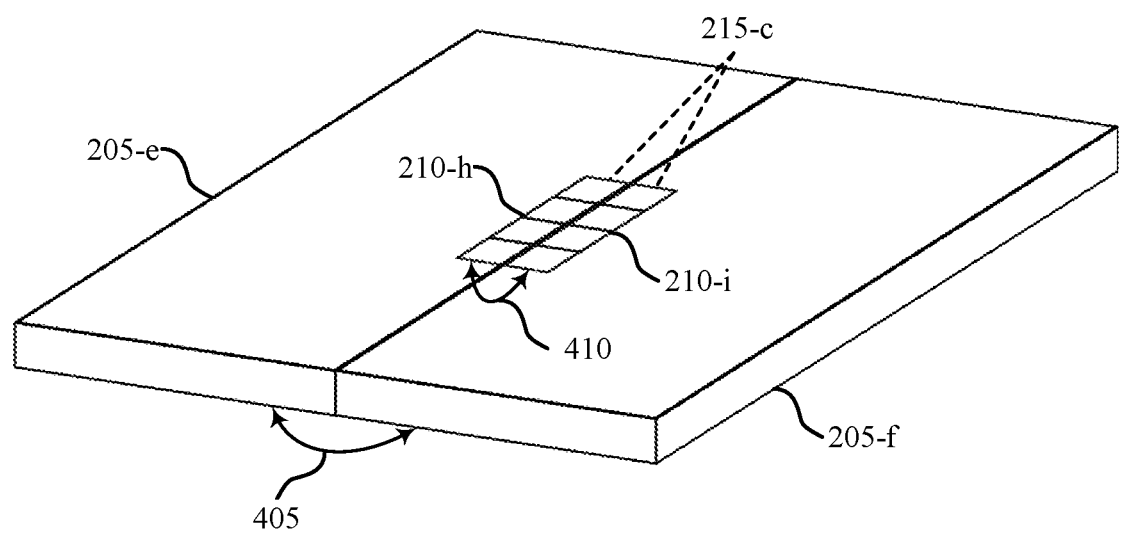
FIG. 4 illustrates an example of a device configuration that supports flexible beamforming techniques for wireless devices in accordance with one or more aspects of the present disclosure.

FIG. 4 illustrates an example of a device configuration 400 that supports flexible beamforming techniques for wireless devices in accordance with one or more aspects of the present disclosure. In some examples, device configuration 400 may implement aspects of wireless communications systems 100 or 200. Device configuration 400 may be a configuration of a UE 115 as described herein.

UE 115 may include a foldable display with foldable units 205-e and 205-f. Antenna array 210-h may be associated with foldable unit 205-e, and antenna array 210-i may be associated with foldable unit 205-f. UE 115 may include additional antenna arrays 210 (not shown), including one or more antenna arrays 210 that may be blocked or otherwise unable to transmit or received based on the device configuration of UE 115. Each of antenna arrays 210-h and 210-i may be a receive antenna array, a transmit antenna array, or both. Foldable units 205-e and 205-f may be associated with angle information 405. UE 115 may identify the angle information 405 based on an angle separation 410, which may identify the angle separation between antenna arrays 210-h and 210-i. Additionally or alternatively, UE 115 may identify the angle information 405 based on relative positioning information from one or more sensors of UE 115 with respect to a reference direction. The angle separation 410 may have a value φ=180°. UE 115 may determine that UE 115 is in the flat state based on the angle separation 410.

UE 115 may configure antenna arrays 210-*h* and 210-*i* into configured antenna set 215-*c*. UE 115 may perform beamforming communication via configured antenna set 215-*c*. In some cases, antenna arrays 210-*h* and 210-*i* may point in the same direction. Additionally or alternatively, antenna arrays 210-*h* and 210-*i* may be co-phased.

UE 115 may transmit foldable state capability information to base station 105 based on determining that UE 115 is in the flat state. UE 115 may transmit the foldable state capability information in a beamformed signal via configured antenna set 215-*c*. In some examples, UE 115 may transmit the foldable state capability information in a UE capability message. In some cases, the foldable state capability information may include feedback indicating one or more of the configured antenna sets 215 may be blocked based on the device configuration of UE 115.

UE 115 may receive signaling from base station 105 based on the transmitted foldable state capability information. UE 115 may receive the signaling in a beamformed signal via configured antenna set 215-*c*. UE 115 may adjust or refine the beamforming communication based on the received signaling.

Figure 5:
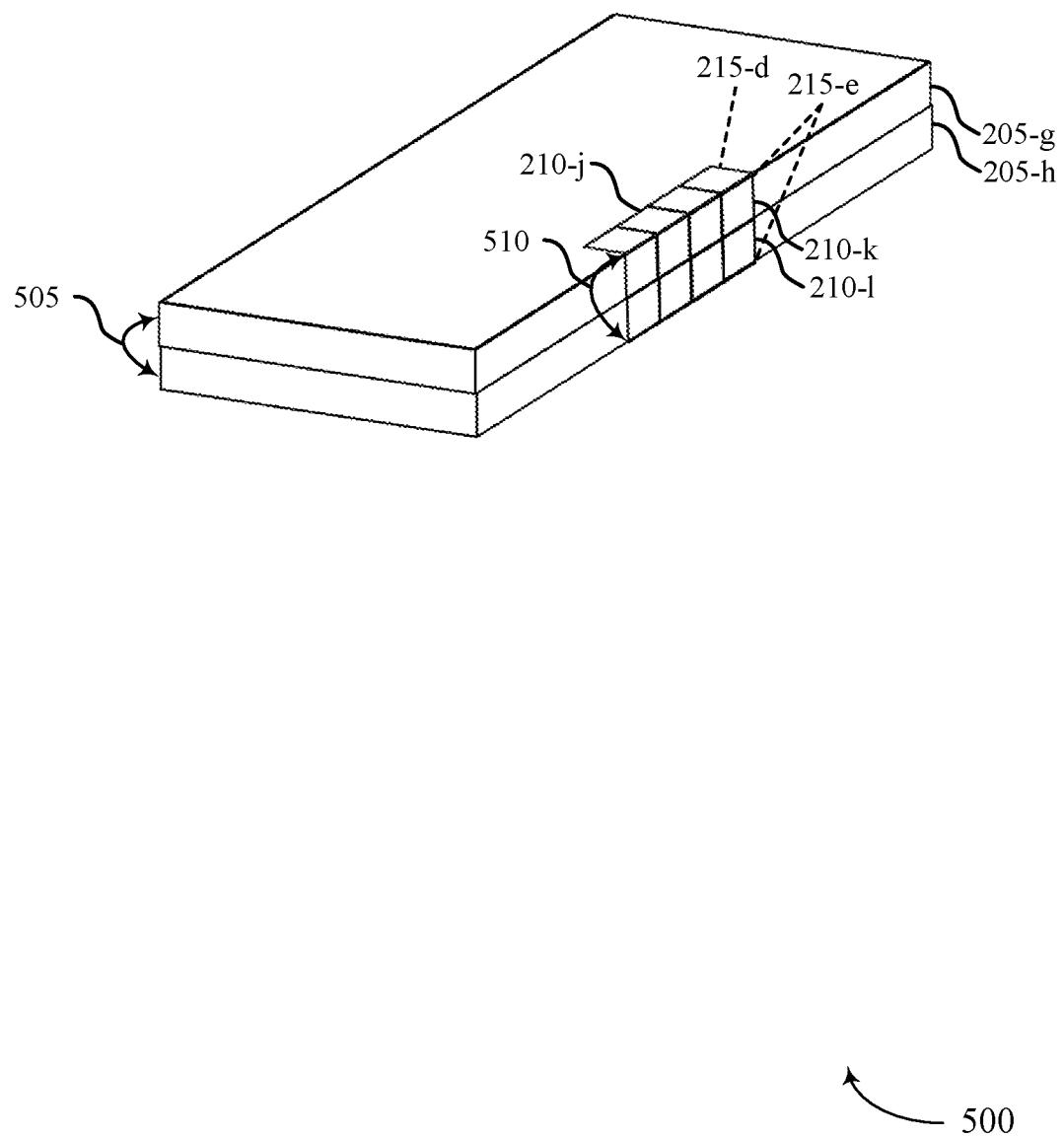
FIG. 5 illustrates an example of a device configuration that supports flexible beamforming techniques for wireless devices in accordance with one or more aspects of the present disclosure.

FIG. 5 illustrates an example of a device configuration 500 that supports flexible beamforming techniques for wireless devices in accordance with one or more aspects of the present disclosure. In some examples, device configuration 500 may implement aspects of wireless communications systems 100 or 200. Device configuration 500 may be a configuration of a UE 115 as described herein.

UE 115 may include a foldable display with foldable units 205-*g* and 205-*h*. Antenna arrays 210-*j* and 210-*k* may be associated with foldable unit 205-*g*, and antenna array 210-1 may be associated with foldable unit 205-*h*. UE 115 may include additional antenna arrays 210 (not shown), including one or more antenna arrays 210 that may be blocked or otherwise unable to transmit or receive based on the device configuration of UE 115. Each of antenna arrays 210-*j*, 210-*k*, and 210-1 may be a receive antenna array, a transmit antenna array, or both. Foldable units 205-*g* and 205-*h* may be associated with angle information 505. UE 115 may identify the angle information 505 based on an angle separation 510, which may identify the angle separation between antenna arrays 210-*k* and 210-1. Additionally or alternatively, UE 115 may identify the angle information 505 based on relative positioning information from one or more sensors of UE 115 with respect to a reference direction. The angle separation 510 may have a value φ=0°. UE 115 may determine that UE 115 is in the folded state based on the angle separation 510.

UE 115 may configure antenna arrays 210-*j*, 210-*k*, and 210-1 into configured antenna sets 215-*d* and 215-*e*. UE 115 may perform beamforming communication via configured antenna sets 215-*d* and 215-*e*. Configured antenna set 215-*d* may include antenna array 210-*j*, and configured antenna set 215-*e* may include antenna arrays 210-*k* and 210-1. In some cases, antenna array 210-*j* may point in a first direction, and antenna arrays 210-*k* and 210-1 may point in a second direction. Additionally or alternatively, antenna arrays 210-*k* and 210-1 may be co-phased.

UE 115 may transmit foldable state capability information to base station 105 based on determining that UE 115 is in the folded state. UE 115 may transmit the foldable state capability information in a beamformed signal via one or more of configured antenna sets 215-*d* and 215-*e*. In some examples, UE 115 may transmit the foldable state capability information in a UE capability message. In some cases, the foldable state capability information may include feedback indicating one or more of the configured antenna sets 215 may be blocked based on the device configuration of UE 115.

UE 115 may receive signaling from base station 105 based on the transmitted foldable state capability information. UE 115 may receive the signaling in a beamformed signal via one or more of configured antenna sets 215-*d* and 215-*e*. UE 115 may adjust or refine the beamforming communication based on the received signaling.

Figure 6:
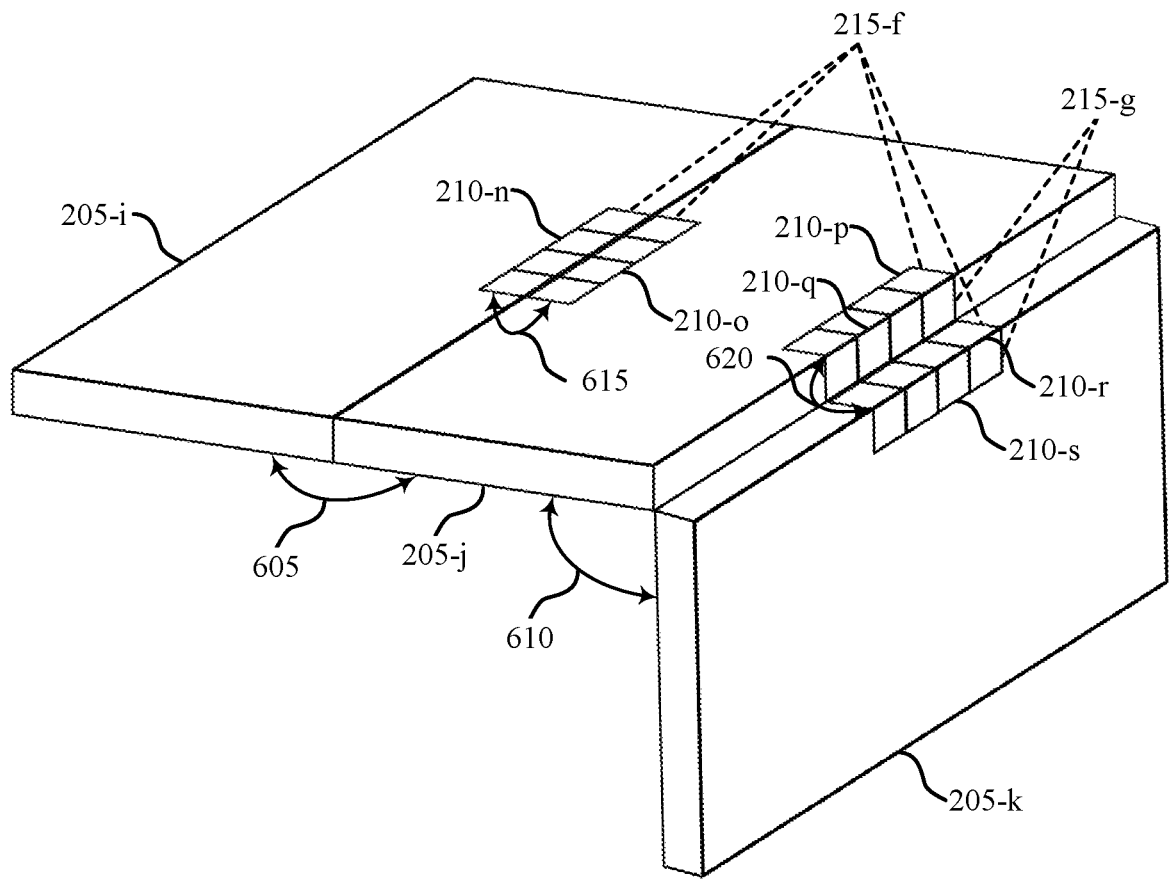
FIG. 6 illustrates an example of a device configuration that supports flexible beamforming techniques for wireless devices in accordance with one or more aspects of the present disclosure.

FIG. 6 illustrates an example of a device configuration 600 that supports flexible beamforming techniques for wireless devices in accordance with one or more aspects of the present disclosure. In some examples, device configuration 600 may implement aspects of wireless communications systems 100 or 200. Device configuration 600 may be a configuration of a UE 115 as described herein.

UE 115 may include a foldable display with foldable units 205-*i*, 205-*j*, and 205-*k*. Antenna array 210-*n* may be associated with foldable unit 205-*i*, antenna arrays 210-*o*, 210-*p* and 210-*q* may be associated with foldable unit 205-*j*, and antenna arrays 210-*r* and 210-*s* may be associated with foldable unit 205-*k*. UE 115 may include additional antenna arrays 210 (not shown), including one or more antenna arrays 210 that may be blocked or otherwise unable to transmit or receive based on the device configuration of UE 115. Each of antenna arrays 210-*n*, 210-*o*, 210-*p*, 210-*q*, 210-*r*, and 210-*s* may be a receive antenna array, a transmit antenna array, or both. Foldable units 205-*i* and 205-*j* may be associated with angle information 605, and foldable units 205-*j* and 205-*k* may be associated with angle information 610. UE 115 may identify the angle information 605 based on an angle separation 615, which may identify the angle separation between antenna arrays 210-*n* and 210-*o*. UE 115 may identify the angle information 610 based on an angle separation 620, which may identify the angle separation between antenna arrays 210-*p* and 210-*s* or between antenna arrays 210-*q* and 210-*r*. Additionally or alternatively, UE 115 may identify the angle information 605 and the angle information 610 based on relative positioning information from one or more sensors of UE 115 with respect to a reference direction. UE 115 may determine a foldable state of UE 115 based on the angle separations 615 and 620.

UE 115 may configure antenna arrays 210-*n*, 210-*o*, 210-*p*, 210-*q*, 210-*r*, and 210-*s* into configured antenna sets 215-*f* and 215-*g*. UE 115 may perform beamforming communication via configured antenna sets 215-*f* and 215-*g*. Configured antenna set 215-*f* may include antenna arrays 210-*n*, 210-*o*, 210-*p*, and 210-*r*, and configured antenna set 215-*g* may include antenna arrays 210-*q* and 210-*s*. In some cases, antenna arrays 210-*n*, 210-*o*, 210-*p*, and 210-*r* may point in a first direction, and antenna arrays 210-*q* and 210-*s* may point in a second direction. Additionally or alternatively, antenna arrays 210-*n*, 210-*o*, 210-*p*, and 210-*r* may be co-phased, and antenna arrays 210-*q* and 210-*s* may be co-phased.

UE 115 may transmit foldable state capability information to base station 105 based on determining the foldable state of UE 115. UE 115 may transmit the foldable state capability information in a beamformed signal via one or more of configured antenna sets 215-*f* and 215-*g*. In some examples, UE 115 may transmit the foldable state capability information in a UE capability message. In some cases, the foldable state capability information may include feedback indicating one or more of the configured antenna sets 215 may be blocked based on the device configuration of UE 115.

UE 115 may receive signaling from base station 105 based on the transmitted foldable state capability information. UE 115 may receive the signaling in a beamformed signal via one or more of configured antenna sets 215-$f$ and 215-$g$. UE 115 may adjust or refine the beamforming communication based on the received signaling.

Figure 7:
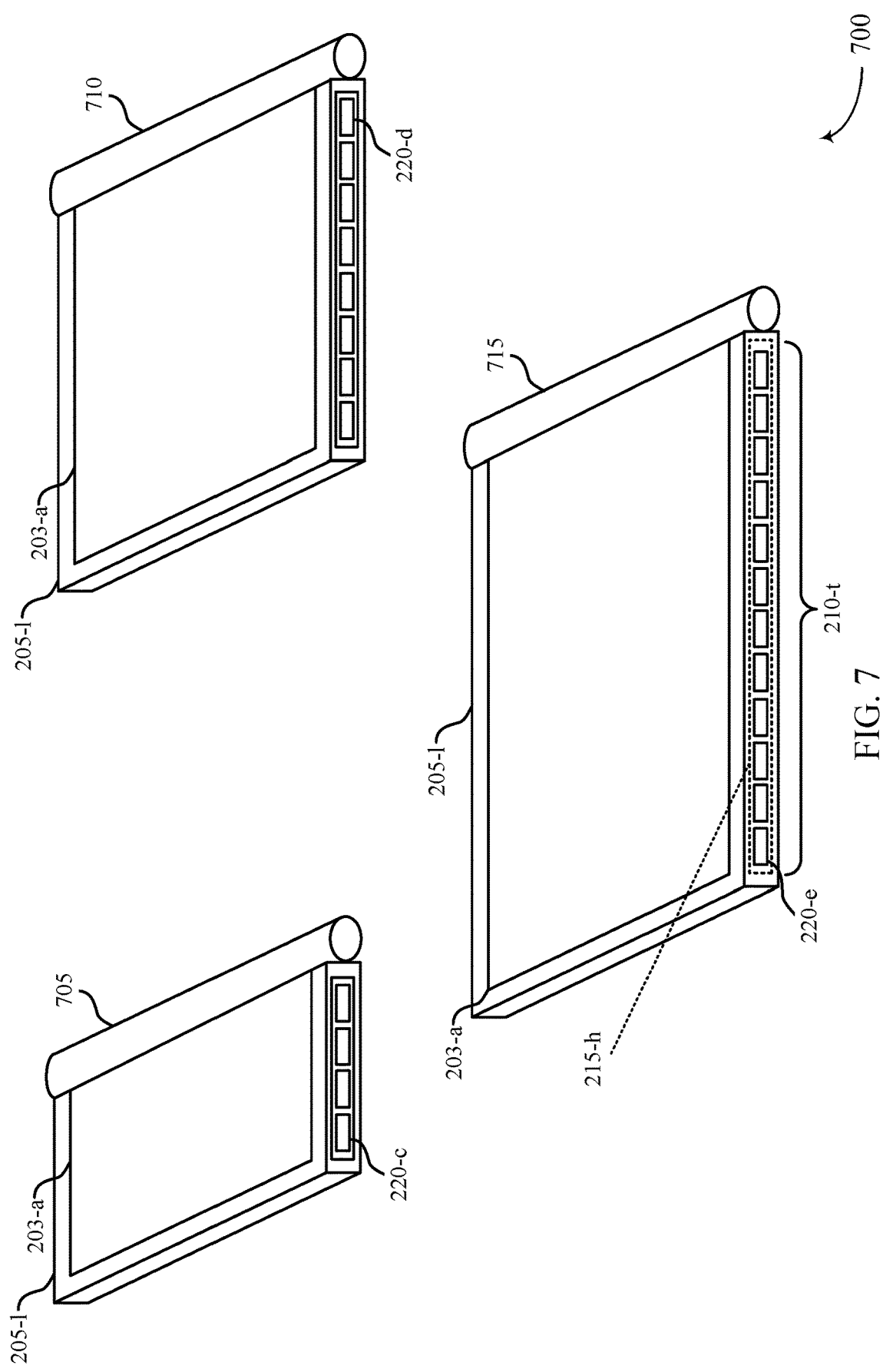
FIG. 7 illustrates an example of a device configuration that supports flexible beamforming techniques for wireless devices in accordance with one or more aspects of the present disclosure.

FIG. 7 illustrates an example of a device configuration 700 that supports flexible beamforming techniques for wireless devices in accordance with one or more aspects of the present disclosure. In some examples, device configuration 700 may implement aspects of wireless communications systems 100 or 200. Device configuration 700 may be a configuration of a UE 115 as described herein and may have a variety of different form factors (e.g., mobile form factor 705, intermediate form factor 710, extended form factor 715).

A UE 115 may include a foldable display 203-$a$ with foldable unit 205-1. Foldable display 203-$a$ may be a rollable or extendable display. Antenna array 210-$t$ may be associated with foldable unit 205-1. In some examples, UE 115 may include multiple antenna arrays 210, including one or more antenna arrays 210 that may be blocked or otherwise unable to transmit or receive based on the configuration (e.g., form factor) of UE 115. Antenna array 210-$t$ may be a receive antenna array, a transmit antenna array, or both. Antenna array 210-$t$ may include multiple antenna elements such as antenna elements 220-$c$, 220-$d$, and 220-$e$ and the UE 115 may configure antenna array 210-$t$ (or one or more of antenna elements 220-$c$, 220-$d$, and 220-$e$) into a configured antenna set 215-$h$ (or multiple antenna sets).

In some cases, UE 115 may identify antenna array information corresponding to antenna array 210-$t$. UE 115 may additionally identify a set of active antenna arrays 210 or antenna elements 220 for beamforming communications.

According to some aspects, UE 115 may determine a form factor of foldable unit 205-1. Foldable unit 205-1 may have a mobile form factor 705 (e.g., an unextended or unrolled form factor), or an intermediate form factor 710, or an extended (e.g., tablet) form factor 715. In some cases, UE 115 may identify the set of active antenna arrays 210 or antenna elements 220 based on the determined form factor. For example, if UE 115 determines foldable unit 205-1 has mobile form factor 705, UE 115 may include antenna element 220-$c$ in the set of active antenna elements 220. Additionally or alternatively, if UE 115 determines foldable unit 205-1 has intermediate form factor 710, UE 115 may include antenna elements 220-$c$ and 220-$d$ in the set of active antenna elements 220. Additionally or alternatively, if UE 115 determines foldable unit 205-1 has tablet form factor 715, UE 115 may include antenna elements 220-$c$, 220-$d$, and 220-$e$ in the set of active antenna elements 220. As the form factor size is reduced, one or more antenna elements 220 may overlap or be blocked. UE 115 may determine the overlapped or blocked antenna elements 220 are in an inactive mode. UE 115 may transmit an indication of the set of active antenna arrays 210 or antenna elements 220 in the antenna array information.

UE 115 may determine a foldable state of UE 115 based on the form factor of foldable unit 205-1. UE 115 may transmit foldable state capability information to base station 105 based on determining the foldable state of UE 115. UE 115 may transmit the foldable state capability information in a beamformed signal via configured antenna set 215-$h$. In some examples, UE 115 may transmit the foldable state capability information in a UE capability message. In some cases, the foldable state capability information may include feedback indicating one or more configured antenna sets 215 may be blocked based on the device configuration or the form factor of UE 115.

UE 115 may receive signaling from base station 105 based on the transmitted foldable state capability information. UE 115 may receive the signaling in a beamformed signal via configured antenna set 215-$h$. UE 115 may adjust or refine the beamforming communication based on the received signaling. UE 115 may communicate (e.g., with a base station 105) based on the refined or adjusted beamforming.

Figure 8:
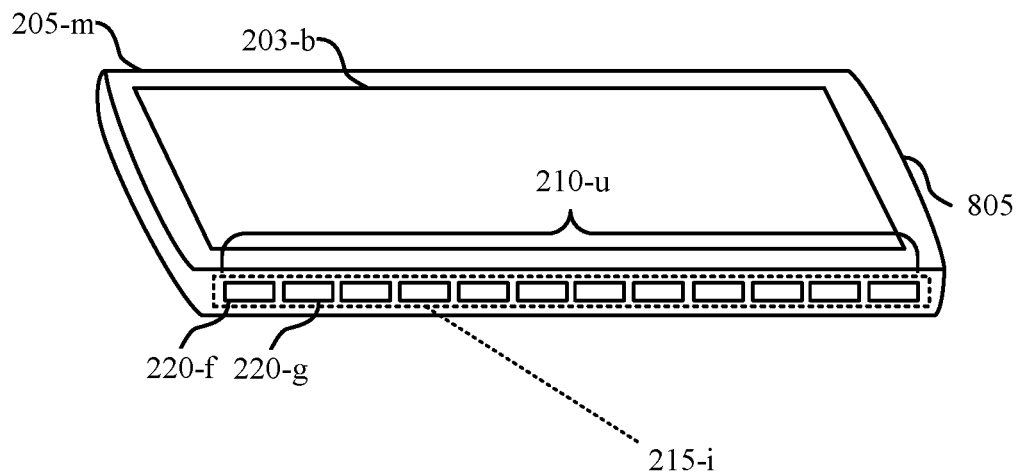
FIG. 8 illustrates an example of a device configuration that supports flexible beamforming techniques for wireless devices in accordance with one or more aspects of the present disclosure.
Figure 8:
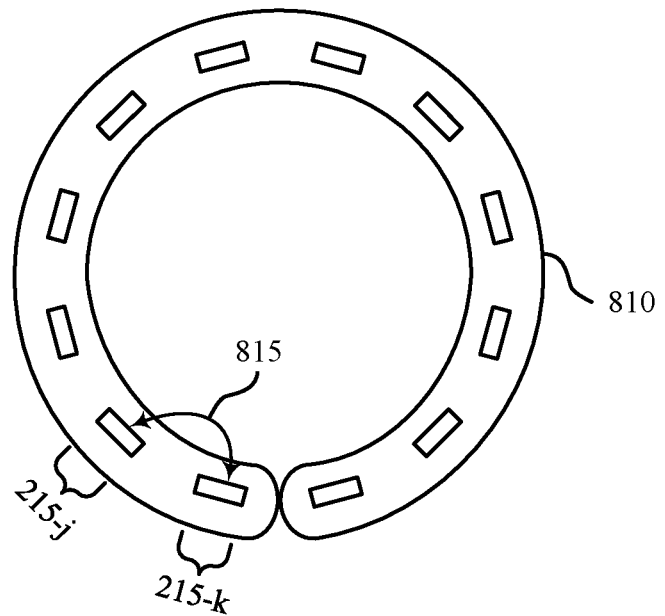

FIG. 8 illustrates an example of a device configuration 800 that supports flexible beamforming techniques for wireless devices in accordance with one or more aspects of the present disclosure. In some examples, device configuration 800 may implement aspects of wireless communications systems 100 or 200. Device configuration 800 may be a configuration of a UE 115 as described herein and may have a variety of different form factors (e.g., mobile form factor 805, wearable form factor 810).

A UE 115 may include a foldable display 203-$b$ with foldable unit 205-$m$. Foldable display 203-$b$ may be a rollable or extendable display. The UE 115 may include an antenna array 210-$u$ having one or more antenna elements such as antenna elements 220-$f$ and 220-$g$. In some examples, UE 115 may include multiple antenna arrays 210, including one or more antenna arrays 210 that may be blocked or otherwise unable to transmit or receive based on the configuration (e.g., form factor) of UE 115. Antenna array 210-$u$ may be a receive antenna array, a transmit antenna array, or both.

UE 115 may configure antenna array 210-$u$ (or one or more of antenna elements 220-$f$ and 220-$g$) into configured antenna sets 215-$i$, 215-$j$, and 215-$k$. UE 115 may perform beamforming communications via one or more configured antenna sets 215-$i$, 215-$j$, 215-$k$, each having one or more antenna elements such as antenna elements 220-$f$ and 220-$g$. In some cases, antenna set 215-$i$ may point in a first direction, antenna set 215-$j$ may point in a second direction, and antenna set 215-$k$ may point in a third direction.

UE 115 may identify antenna array information corresponding to antenna sets 215-$i$, 215-$j$, and 215-$k$. UE 115 may additionally identify a set of active antenna arrays 210 or antenna elements 220 for beamforming communications.

UE 115 may determine a form factor of foldable unit 205-$m$. Foldable unit 205-$m$ may have a mobile form factor 805, or a wearable form factor 810. UE 115 may identify the set of active antenna arrays 210, configured antenna sets, or antenna elements 220 based on the determined form factor. For example, if UE 115 determines foldable unit 205-$m$ has mobile form factor 805, UE 115 may include antenna set 215-$i$ in the set of active antenna arrays 210. Additionally or alternatively, if UE 115 determines foldable unit 205-$m$ has wearable form factor 810, UE 115 may include antenna sets 215-$j$ and 215-$k$ in the set of active antenna arrays 210. UE 115 may transmit an indication of the set of active antenna arrays 210, antenna sets 215, or antenna elements 220 in the antenna array information.

As foldable unit 205-$m$ is rolled in a wearable shape, UE 115 may identify angle information based on an angle separation 815, which may identify the angle separation between antenna sets 215-$j$ and 215-$k$. Additionally or alternatively, UE 115 may identify the angle information based on relative positioning information from one or more sensors of UE 115 with respect to a reference direction. UE 115 may determine the form factor of UE 115 based on the angle separation 815.

UE 115 may determine a foldable state of UE 115 based on the form factor of foldable unit 205-*m*. UE 115 may transmit foldable state capability information to base station 105 based on determining the foldable state of UE 115. UE 115 may transmit the foldable state capability information in a beamformed signal via one or more of configured antenna sets 215-*i*, 215-*j*, and 215-*k*. In some examples, UE 115 may transmit the foldable state capability information in a UE capability message. In some cases, the foldable state capability information may include feedback indicating one or more configured antenna sets 215 may be blocked based on the device configuration or the form factor of UE 115.

UE 115 may receive signaling from base station 105 based on the transmitted foldable state capability information. UE 115 may receive the signaling in a beamformed signal via one or more of configured antenna sets 215-*i*, 215-*j*, and 215-*k*. UE 115 may adjust or refine the beamforming communication based on the received signaling. UE 115 may communicate (e.g., with a base station 105) based on the refined or adjusted beamforming.

Figure 9:
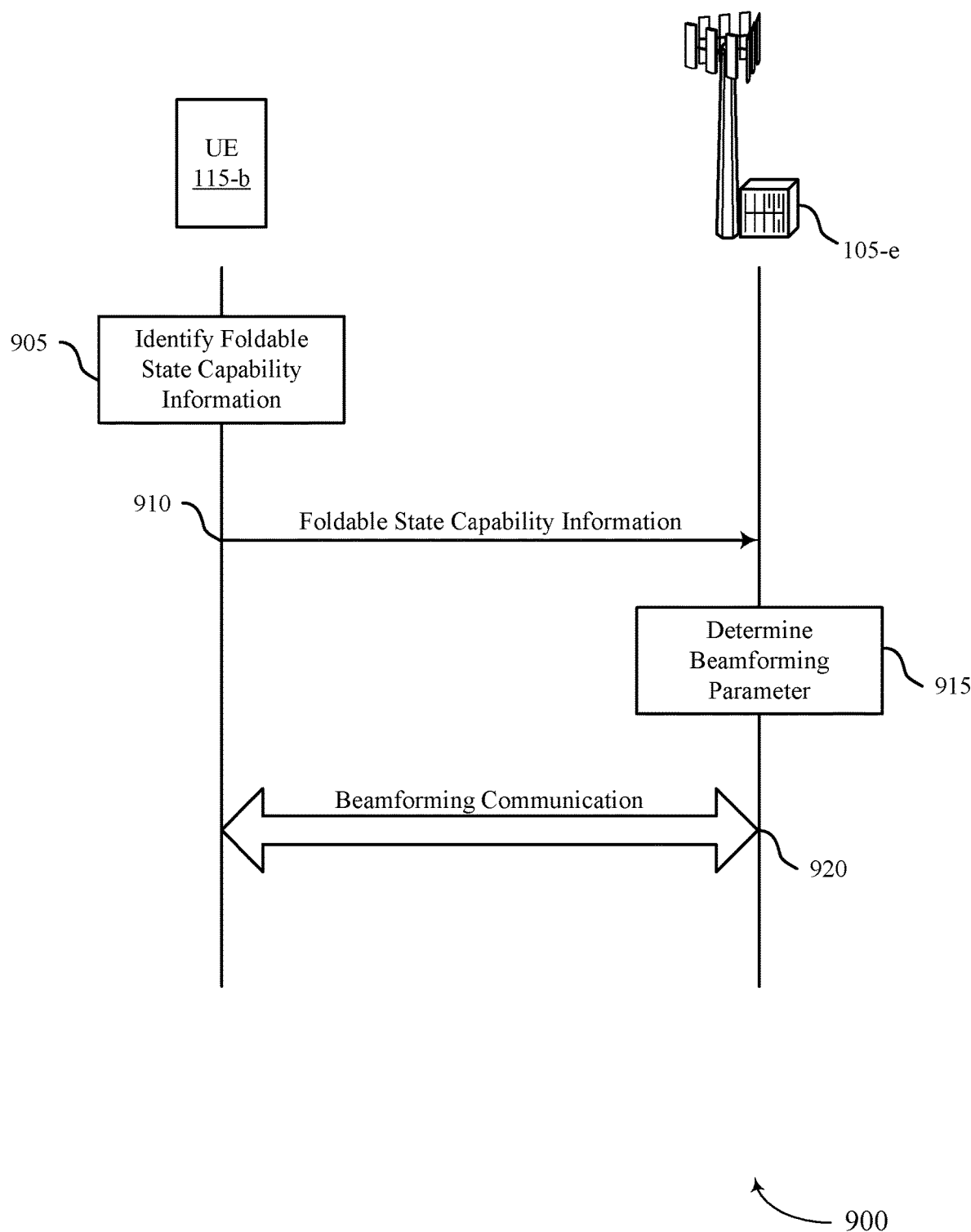
FIG. 9 illustrates an example of a process flow that supports flexible beamforming techniques for wireless devices in accordance with one or more aspects of the present disclosure.

FIG. 9 illustrates an example of a process flow 900 that supports flexible beamforming techniques for wireless devices in accordance with one or more aspects of the present disclosure. In some examples, process flow 900 may implement aspects of wireless communications systems 100 or 200. Process flow 900 includes UE 115-*b* and base station 105-*e*, which may be respective examples of a UE 115 and a network device 105 as described herein.

At 905, UE 115-*b* may identify foldable state capability information of UE 115-*b*. The foldable state capability information may correspond to one or more foldable units. In some examples, UE 115-*b* may determine a number of independently foldable units of the one or more foldable units of UE 115-*b*. In some examples, UE 115-*b* may determine angle information associated with the one or more foldable units. In some cases, determining the angle information may include UE 115-*b* identifying an angle separation between a first antenna array of a first foldable unit of the one or more foldable units and a second antenna array of a second foldable unit of the one or more foldable units. In some cases, determining the angle information may include UE 115-*b* obtaining positioning information from one or more sensors of UE 115-*b*. UE 115-*b* may determine an angle between two or more antenna arrays of the one or more foldable units based on the positioning information. In some examples, UE 115-*b* may determine a foldable state of UE 115-*b* based on the one or more foldable units. In some cases, the foldable state of UE 115-*b* may include a single quantized state of a set of quantized states associated with UE 115-*b*. Additionally or alternatively, the foldable state of UE 115-*b* may include one of a folded state, one or more partially open states, a fully open state, or a flat state. Additionally or alternatively, the foldable state of UE 115-*b* may be associated with a 0 degree angle, a 90 degree angle, a 180 degree angle, or an intermediate angle between two or more of the one or more foldable units.

At 910, UE 115-*b* may transmit, and base station 105-*e* may receive, an indication of the foldable state capability information. In some cases, UE 115-*b* may transmit, and base station 105-*e* may receive, the number of independently foldable units in the foldable state capability information. In some cases, UE 115-*b* may transmit, and base station 105-*e* may receive, the angle information associated with the one or more foldable units in the foldable state capability information. In some cases, UE 115-*b* may transmit, and base station 105-*e* may receive, an indication of the foldable state in the foldable state capability information.

At 915, base station 105-*e* may determine a beamforming parameter for beamforming communications with UE 115-*b* based on the foldable state capability information.

In some examples, base station 105-*e* may determine a periodicity for a set of reference signals of a beam training process for UE 115-*b*. Additionally or alternatively, base station 105-*e* may increase or decrease the periodicity of the set of reference signals with respect to a current or previous periodicity of the set of reference signals. The set of reference signal may include a set of CSI-RSs. Base station 105-*e* may transmit an indication of the periodicity for the set of reference signals of the beam training process to UE 115-*b*. In some examples, base station 105-*e* may transmit the indication of the periodicity to UE 115-*b* via a downlink control channel.

In some examples, base station 105-*e* may determine one or more of: a set of beam indices for beamforming communications with UE 115-*b*, a beamwidth for beamforming communications with UE 115-*b*, a transmit power for at least one beam for beamforming communications with UE 115-*b*, and respective transmit powers for each of a set of beams for beamforming communications with UE 115-*b*. In some examples, base station 105-*e* may transmit to UE 115-*b* one or more of an indication of the set of beam indices and an indication of the beamwidth.

At 920, UE 115-*b* and base station 105-*e* may perform a beamforming communication with one another based on the foldable state capability information and the beamforming parameter. In some examples, the beamforming communication may include the indication of the foldable state capability information in a UE capability message. In some examples, UE 115-*b* may configure a set of receive antenna arrays based on the foldable state capability information. UE 115-*b* may receive a beamformed signal from base station 105-*e* via the configured antenna set of receive antenna arrays. In some examples, UE 115-*b* may configure a set of transmit antenna arrays based on the foldable state capability information. UE 115-*b* may transmit a beamformed signal to base station 105-*e* via the configured antenna set of transmit antenna arrays. In some examples, base station 105-*e* may transmit the beamforming communication to UE 115-*b* via the at least one beam in accordance with the transmit power.

Figure 10:
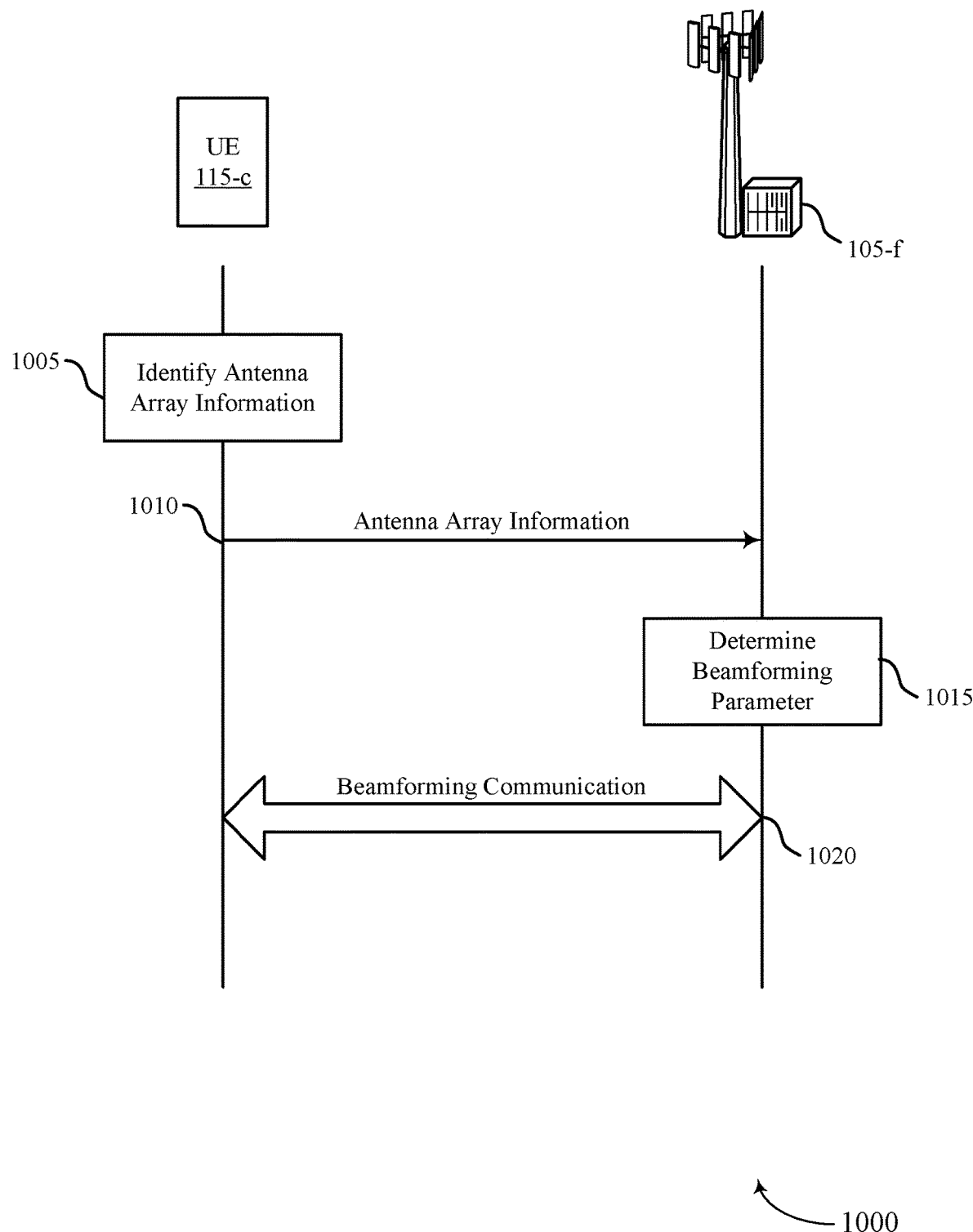
FIG. 10 illustrates an example of a process flow that supports flexible beamforming techniques for wireless devices in accordance with one or more aspects of the present disclosure.

FIG. 10 illustrates an example of a process flow 1000 that supports flexible beamforming techniques for wireless devices in accordance with one or more aspects of the present disclosure. In some examples, process flow 1000 may implement aspects of wireless communications systems 100 or 200. Process flow 1000 includes UE 115-*c* and base station 105-*f*, which may be respective examples of a UE 115 and a network device 105 as described herein.

At 1005, UE 115-*c* may identify antenna array information of UE 115-*c*, the antenna array information corresponding to multiple antenna arrays. In some examples, UE 115-*c* may identify a set of active antenna arrays for beamforming communications with base station 105-*f*.

At 1010, UE 115-*c* may transmit, and base station 105-*f* may receive, an indication of the antenna array information. In some examples, UE 115-*c* may transmit, and base station 105-*f* may receive, an indication of the set of active antenna arrays in the antenna array information.

At 1015, base station 105-*f* may determine a beamforming parameter for beamforming communications with UE 115-*c* based on the antenna array information. In some examples, base station 105-*f* may identify the set of active antenna arrays of UE 115-*c* for beamforming communications based on the antenna array information. Base station 105-*f* may determine the beamforming parameter based on the set of active antenna arrays.

At 1020, UE 115-*c* and base station 105-*f* may perform a beamforming communication with one another based on the antenna array information and the beamforming parameter.

Figure 11:
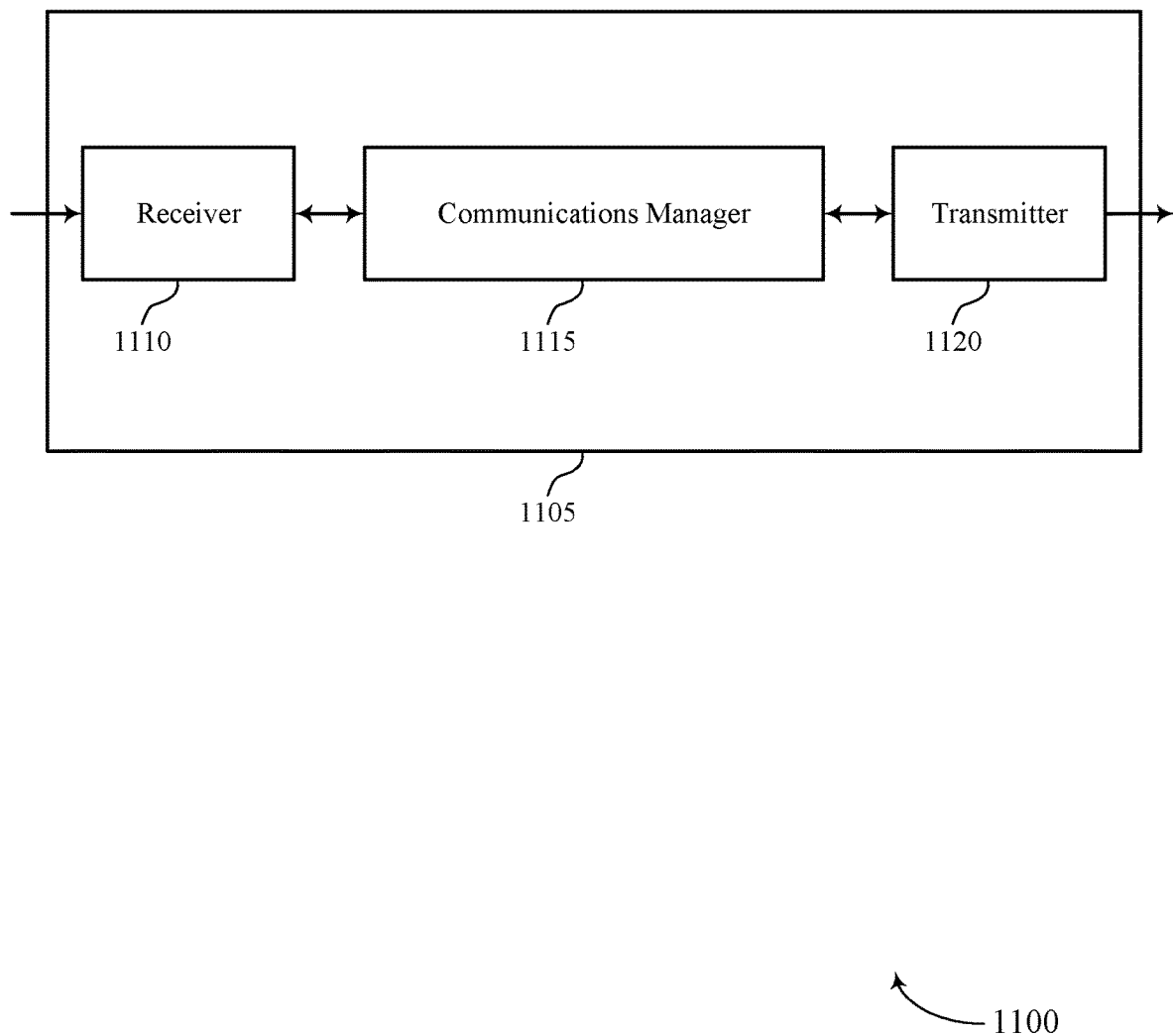
FIGS. 11 and 12 show block diagrams of devices that support flexible beamforming techniques for wireless devices in accordance with one or more aspects of the present disclosure.

FIG. 11 shows a block diagram 1100 of a device 1105 that supports flexible beamforming techniques for wireless devices in accordance with one or more aspects of the present disclosure. The device 1105 may be an example of aspects of a UE as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to flexible beamforming techniques for wireless devices, etc.). Information may be passed on to other components of the device 1105. The receiver 1110 may be an example of aspects of the transceiver 1220 described with reference to FIG. 12. The receiver 1110 may utilize a single antenna or a set of antennas.

The communications manager 1115 may identify foldable state capability information of the UE, the foldable state capability information corresponding to a state of the one or more foldable units, transmit an indication of the foldable state capability information to a base station in communications with the UE, and perform a beamforming communication between the base station and the UE based on the foldable state capability information.

The communications manager 1115 may also identify antenna array information of the UE, the antenna array information corresponding to the multiple antenna arrays, transmit an indication of the antenna array information to a base station in communication with the UE, and perform a beamforming communication with the base station based on the antenna array information. The communications manager 1115 may be an example of aspects of the communications manager 1210 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1220 described with reference to FIG. 12. The transmitter 1120 may utilize a single antenna or a set of antennas.

Figure 12:
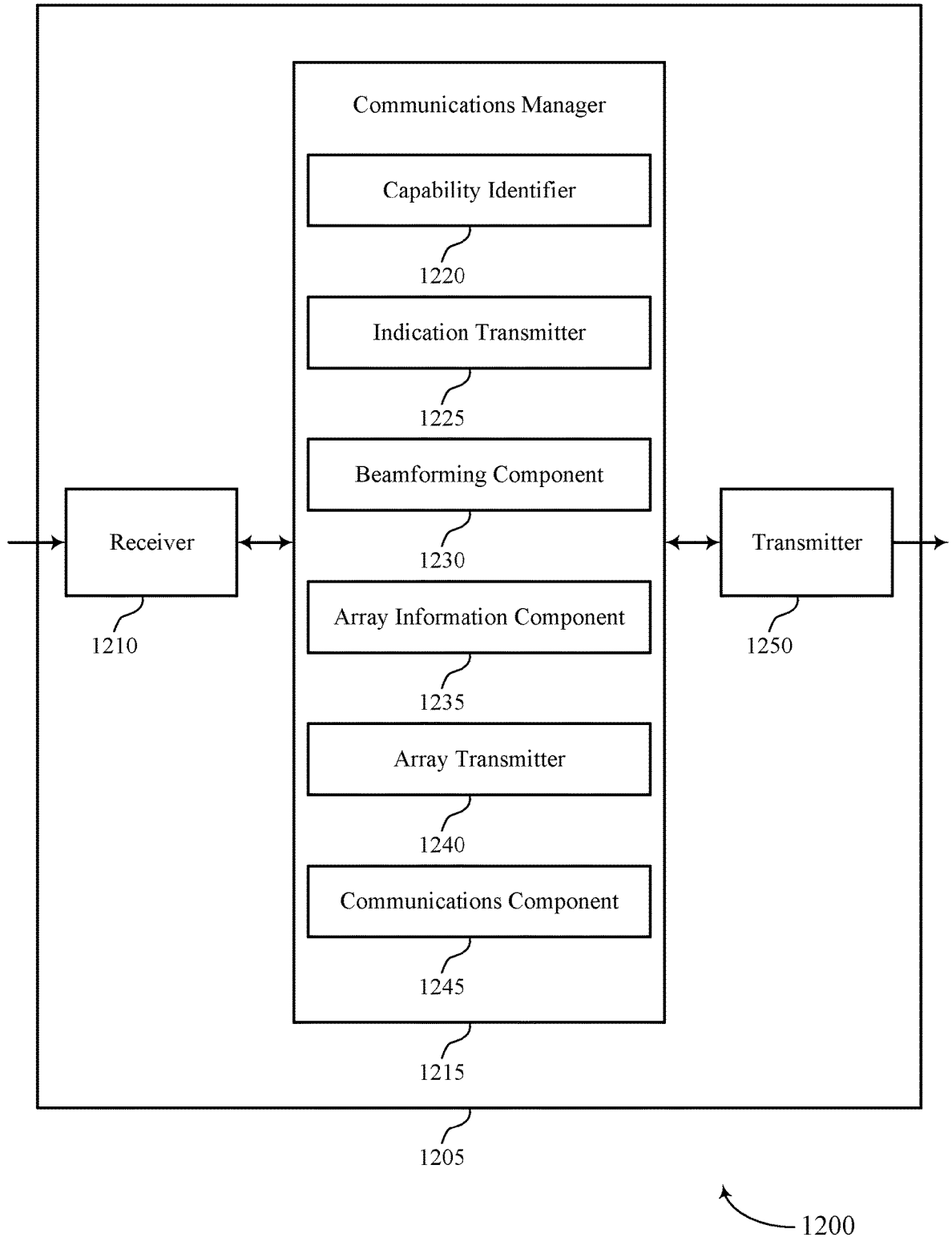

FIG. 12 shows a block diagram 1200 of a device 1205 that supports flexible beamforming techniques for wireless devices in accordance with one or more aspects of the present disclosure. The device 1205 may be an example of aspects of a device 1105, or a UE as described herein. The device 1205 may include a receiver 1210, a communications manager 1215, and a transmitter 1250. The device 1205 may also include a processor. Each of these components may be in communication with one another (e.g., via one or more buses).

The receiver 1210 may receive information such as packets, user data, or control information associated with various information channels (e.g., control channels, data channels, and information related to flexible beamforming techniques for wireless devices, etc.). Information may be passed on to other components of the device 1205. The receiver 1210 may be an example of aspects of the transceiver 1220 described with reference to FIG. 12. The receiver 1210 may utilize a single antenna or a set of antennas.

The communications manager 1215 may be an example of aspects of the communications manager 1115 as described herein. The communications manager 1215 may include a capability identifier 1220, an indication transmitter 1225, a beamforming component 1230, an array information component 1235, an array transmitter 1240, and a communications component 1245. The communications manager 1215 may be an example of aspects of the communications manager 1210 described herein.

The capability identifier 1220 may identify foldable state capability information of the UE, the foldable state capability information corresponding to a state of the one or more foldable units. The indication transmitter 1225 may transmit an indication of the foldable state capability information to a base station in communications with the UE. The beamforming component 1230 may perform a beamforming communication between the base station and the UE based on the foldable state capability information. The array information component 1235 may identify antenna array information of the UE, the antenna array information corresponding to the multiple antenna arrays. The array transmitter 1240 may transmit an indication of the antenna array information to a base station in communication with the UE. The communications component 1245 may perform a beamforming communication with the base station based on the antenna array information. The transmitter 1250 may transmit signals generated by other components of the device 1205. In some examples, the transmitter 1250 may be collocated with a receiver 1210 in a transceiver module. For example, the transmitter 1250 may be an example of aspects of the transceiver 1220 described with reference to FIG. 12. The transmitter 1250 may utilize a single antenna or a set of antennas.

Figure 13:
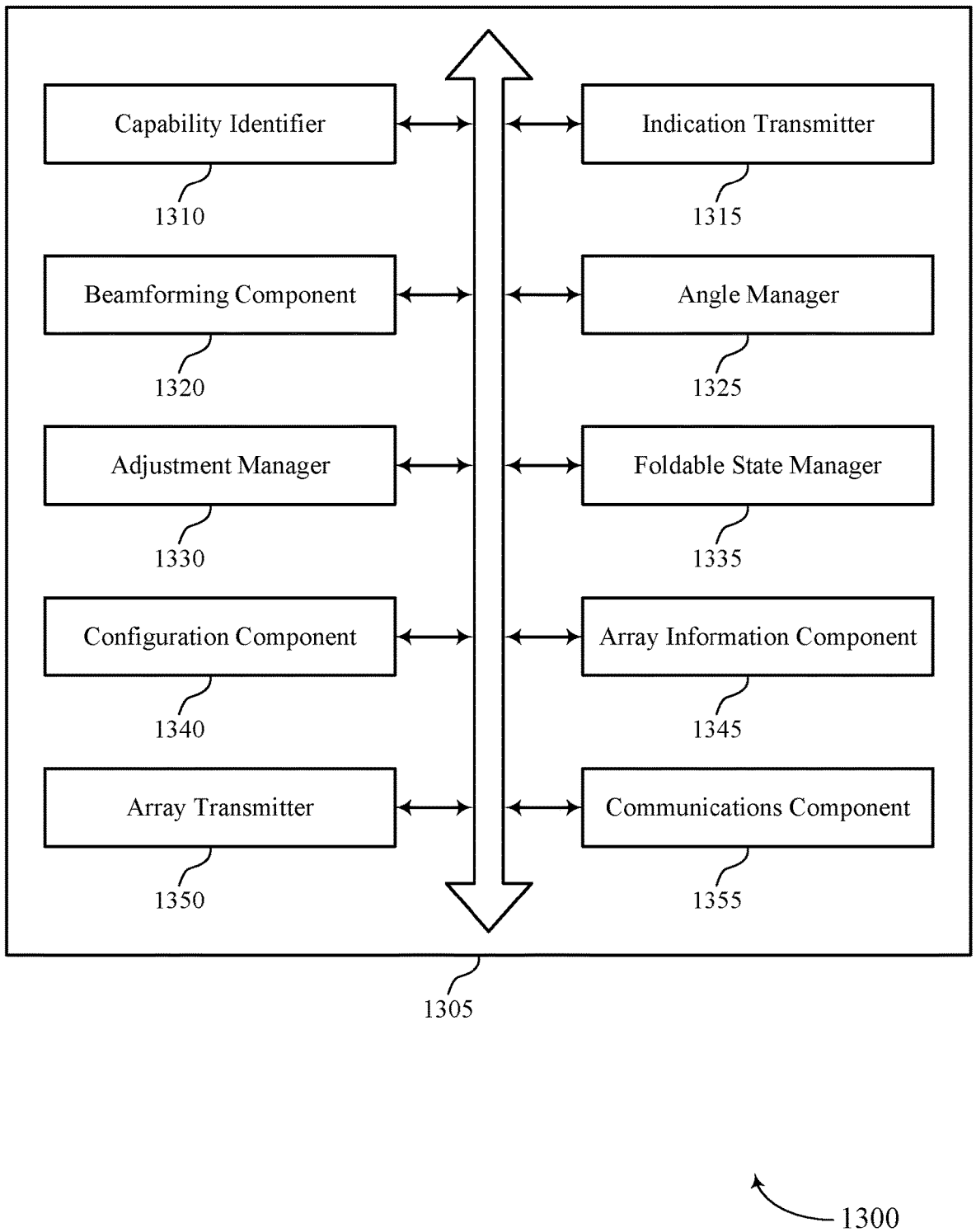
FIG. 13 shows a block diagram of a communications manager that supports flexible beamforming techniques for wireless devices in accordance with one or more aspects of the present disclosure.

FIG. 13 shows a block diagram 1300 of a communications manager 1305 that supports flexible beamforming techniques for wireless devices in accordance with one or more aspects of the present disclosure. The communications manager 1305 may be an example of aspects of a communications manager 1115, a communications manager 1215, or a communications manager 1210 described herein. The communications manager 1305 may include a capability identifier 1310, an indication transmitter 1315, a beamforming component 1320, an angle manager 1325, an adjustment manager 1330, a foldable state manager 1335, a configuration component 1340, an array information component 1345, an array transmitter 1350, and a communications component 1355. Each of these modules may communicate, directly or indirectly, with one another (e.g., via one or more buses).

The capability identifier 1310 may identify foldable state capability information of the UE, the foldable state capability information corresponding to a state of the one or more foldable units. In some examples, the capability identifier 1310 may determine a number of independently foldable units of the one or more foldable units of the UE.

The indication transmitter 1315 may transmit an indication of the foldable state capability information to a base station in communications with the UE. In some examples, the indication transmitter 1315 may transmit the number of the independently foldable units in the foldable state capability information to the base station. In some cases, the indication transmitter 1315 may transmit the angle information associated with the one or more foldable units in the foldable state capability information. In some aspects, the indication transmitter 1315 may transmit an indication of the foldable state in the foldable state capability information. In some instances, the indication transmitter 1315 may include the indication of the foldable state capability information in a UE capability message.

The beamforming component 1320 may perform a beamforming communication between the base station and the UE based on the foldable state capability information. In some examples, the beamforming component 1320 may receive the beamformed communication according to a beamwidth used by the base station based on the foldable state capability information. In some cases, the beamforming component 1320 may receive a beamformed signal from the base station via the configured set of receive antenna arrays. In some aspects, the beamforming component 1320 may transmit a beamformed signal to the base station via the configured set of transmit antenna arrays.

The array information component 1345 may identify antenna array information of the UE, the antenna array information corresponding to the multiple antenna arrays. In some examples, the array information component 1345 may identify a set of active antenna arrays for beamforming communications with the base station.

The array transmitter 1350 may transmit an indication of the antenna array information to a base station in communication with the UE. In some examples, the array transmitter 1350 may transmit an indication of the set of active antenna arrays in the antenna array information.

The communications component 1355 may perform a beamforming communication with the base station based on the antenna array information.

The angle manager 1325 may determine angle information associated with the one or more foldable units. In some examples, the angle manager 1325 may identify an angle separation between a first antenna array of a first foldable unit of the one or more foldable units and a second antenna array of a second foldable unit of the one or more foldable units. In some cases, the angle manager 1325 may obtain relative positioning information from one or more sensors of the UE with respect to a reference direction. In some instances, the angle manager 1325 may determine an angle between two or more antenna arrays of the one or more foldable units based on the relative positioning information.

The adjustment manager 1330 may adjust a beamwidth used by the UE based on the beamwidth used by the base station.

The foldable state manager 1335 may determine a foldable state of the UE based on the one or more foldable units. In some cases, the foldable state of the UE includes a single quantized state from a set of quantized states associated with the UE. In some examples, the foldable state of the UE includes an indication for one of a folded state, one or more partially open states, a fully open state, or a flat state. In some instances, the foldable state of the UE is associated with a 0 degree angle, a 90 degree angle, a 180 degree angle, or an intermediate angle between two or more of the one or more foldable units.

The configuration component 1340 may configure a set of receive antenna arrays of the UE based on the foldable state capability information. In some examples, the configuration component 1340 may configure a set of transmit antenna arrays of the UE based on the foldable state capability information.

Figure 14:
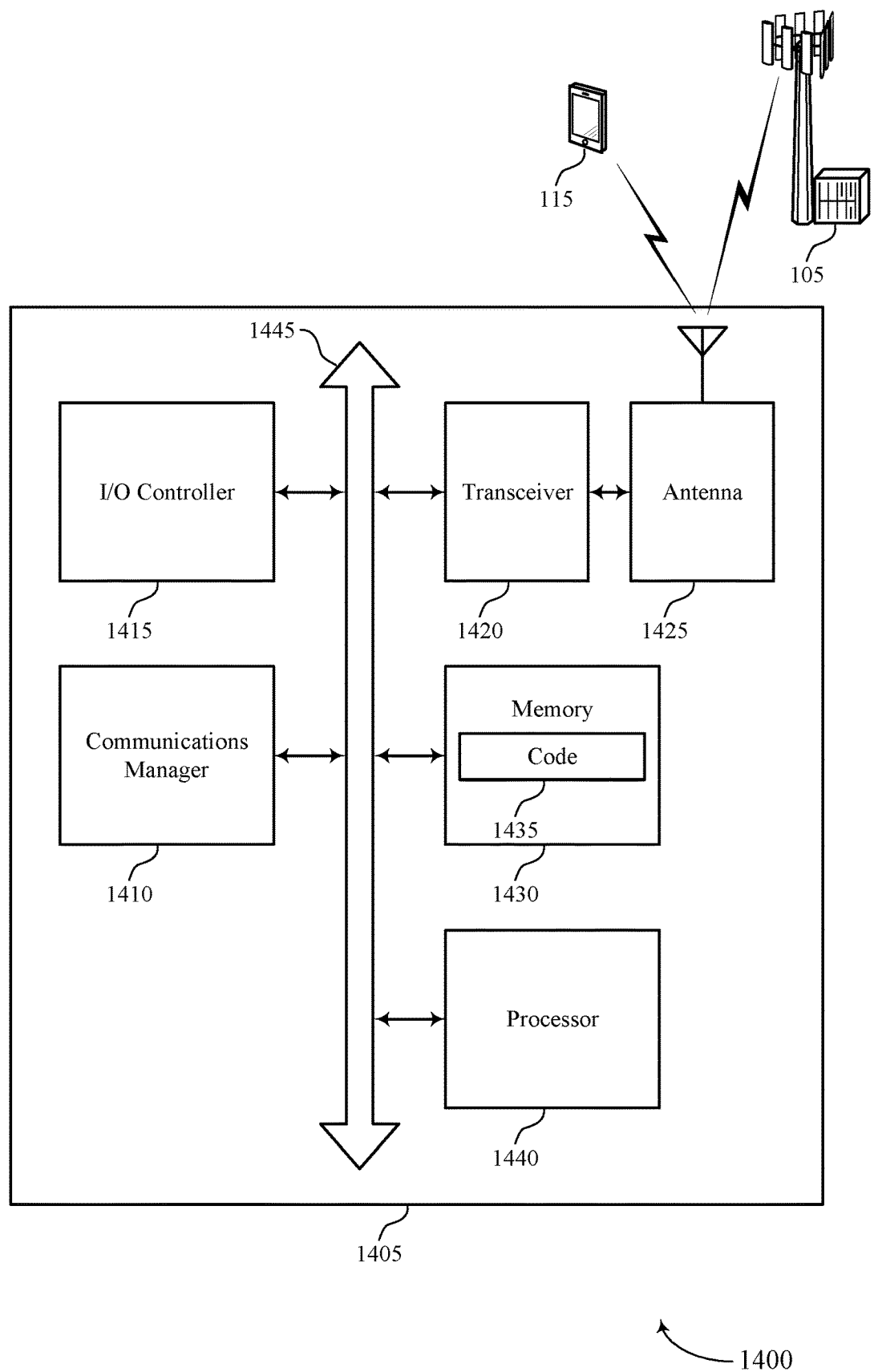
FIG. 14 shows a diagram of a system including a device that supports flexible beamforming techniques for wireless devices in accordance with one or more aspects of the present disclosure.

FIG. 14 shows a diagram of a system 1400 including a device 1405 that supports flexible beamforming techniques for wireless devices in accordance with one or more aspects of the present disclosure. The device 1405 may be an example of or include the components of device 1105, device 1205, or a UE as described herein. The device 1405 may include components for bi-directional voice and data communications including components for transmitting and receiving communications, including a communications manager 1410, an I/O controller 1415, a transceiver 1420, an antenna 1425, memory 1430, and a processor 1440. These components may be in electronic communication via one or more buses (e.g., bus 1445).

The communications manager 1410 may identify foldable state capability information of the UE, the foldable state capability information corresponding to a state of the one or more foldable units, transmit an indication of the foldable state capability information to a base station in communications with the UE, and perform a beamforming communication between the base station and the UE based on the foldable state capability information.

The communications manager 1410 may also identify antenna array information of the UE, the antenna array information corresponding to the multiple antenna arrays, transmit an indication of the antenna array information to a base station in communication with the UE, and perform a beamforming communication with the base station based on the antenna array information.

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the device 1405 may include a single antenna 1425, or the device 1405 may have more than one antenna 1425, which may be capable of concurrently transmitting or receiving multiple wireless transmissions.

The memory 1430 may include random access memory (RAM) and/or read only memory (ROM). The memory 1430 may store computer-readable, computer-executable code 1435 including instructions that, when executed, cause the processor to perform various functions described herein. In some cases, the memory 1430 may contain, among other things, a basic input output system (BIOS) which may control basic hardware or software operation such as the interaction with peripheral components or devices.

The processor 1440 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting flexible beamforming techniques for wireless devices).

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
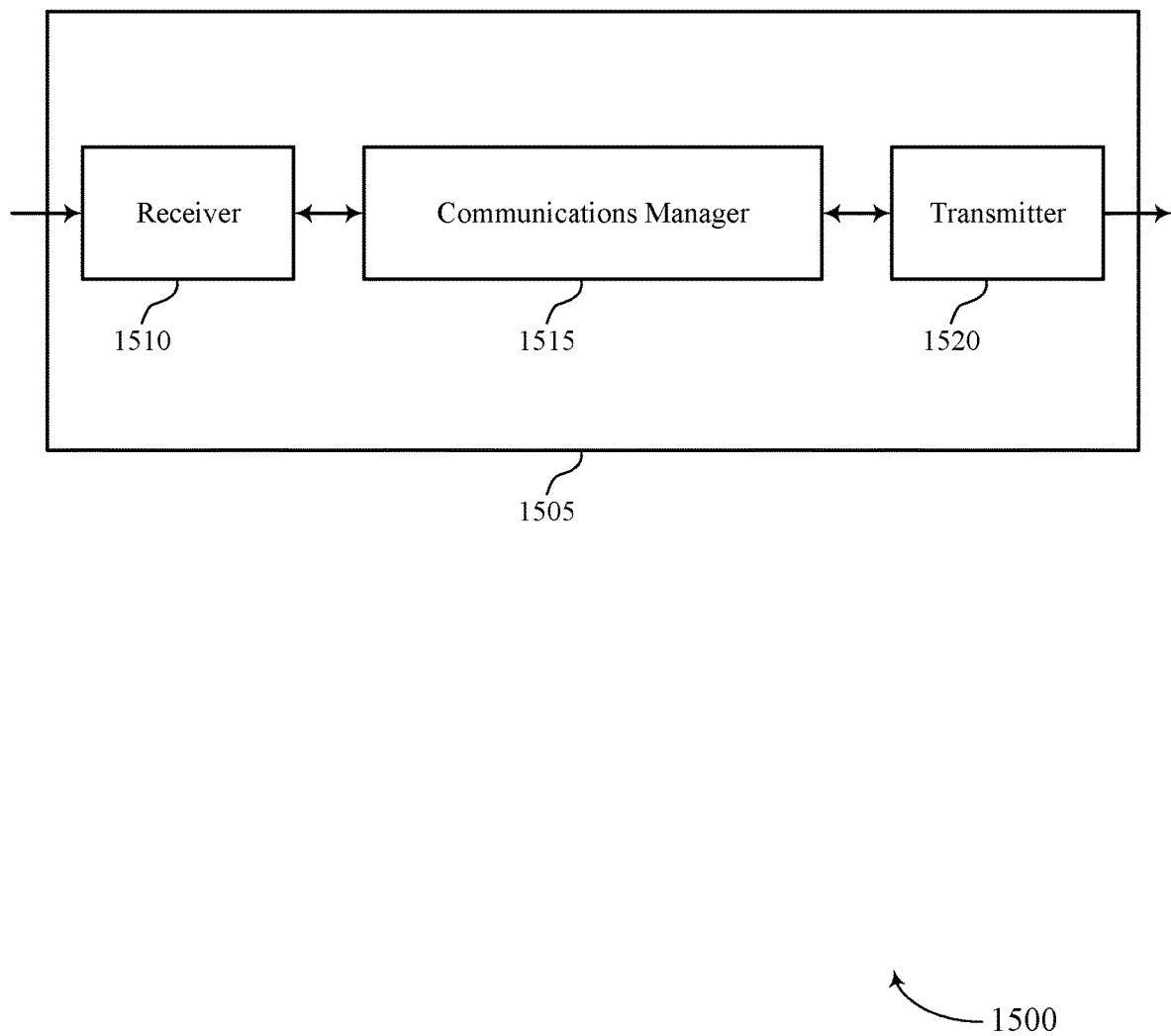
FIGS. 15 and 16 show block diagrams of devices that support flexible beamforming techniques for wireless devices in accordance with one or more aspects of the present disclosure.

FIG. 15 shows a block diagram 1500 of a device 1505 that supports flexible beamforming techniques for wireless devices in accordance with one or more aspects of the present disclosure. The device 1505 may be an example of aspects of a network device (e.g., a base station) as described herein. The device 1505 may include a receiver 1510, a communications manager 1515, and a transmitter 1520. The device 1505 may also include a processor. Each of these components may be in communication with one another (e.g., via one or more buses).

The receiver 1510 may receive information such as packets, user data, or control information associated with various information channels (e.g., control channels, data channels, and information related to flexible beamforming techniques for wireless devices, etc.). Information may be passed on to other components of the device 1505. The receiver 1510 may be an example of aspects of the transceiver 1620 described with reference to FIG. 16. The receiver 1510 may utilize a single antenna or a set of antennas.

The communications manager 1515 may receive, from a UE, an indication of foldable state capability information of the UE, the foldable state capability information corresponding to a state of the one or more foldable units of the UE, determine a beamforming parameter for beamforming communications with the UE based on the foldable state capability information, and perform a beamforming communication with the UE based on the beamforming parameter.

The communications manager 1515 may also receive, from a UE, an indication of antenna array information of the UE, the antenna array information corresponding to multiple antenna arrays of the UE, determine a beamforming parameter for beamforming communications with the UE based on the antenna array information, and perform a beamforming communication with the UE based on the beamforming parameter. The communications manager 1515 may be an example of aspects of the communications manager 1610 described herein.

The communications manager 1515, or its sub-components, may be implemented in hardware, code (e.g., software or firmware) executed by a processor, or any combination thereof. If implemented in code executed by a processor, the functions of the communications manager 1515, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1515, or its sub-components, may be physically located at various positions, including being distributed such that portions of functions are implemented at different physical locations by one or more physical components. In some examples, the communications manager 1515, or its sub-components, may be a separate and distinct component in accordance with various aspects of the present disclosure. In some examples, the communications manager 1515, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1520 may transmit signals generated by other components of the device 1505. In some examples, the transmitter 1520 may be collocated with a receiver 1510 in a transceiver module. For example, the transmitter 1520 may be an example of aspects of the transceiver 1620 described with reference to FIG. 16. The transmitter 1520 may utilize a single antenna or a set of antennas.

Figure 16:
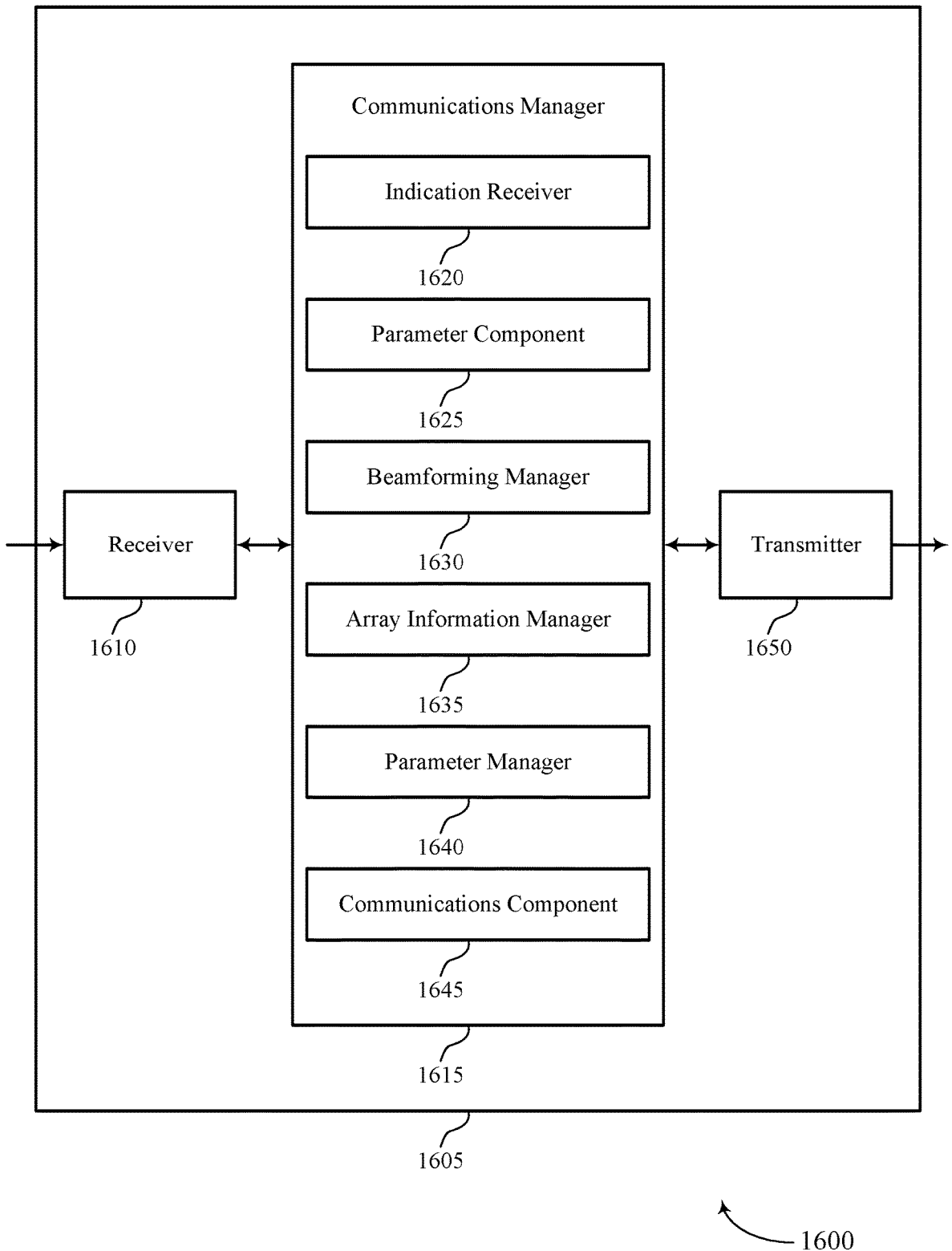

FIG. 16 shows a block diagram 1600 of a device 1605 that supports flexible beamforming techniques for wireless devices in accordance with one or more aspects of the present disclosure. The device 1605 may be an example of aspects of a device 1505, or a network device (e.g., a base station) as described herein. The device 1605 may include a receiver 1610, a communications manager 1615, and a transmitter 1650. The device 1605 may also include a processor. Each of these components may be in communication with one another (e.g., via one or more buses).

The receiver 1610 may receive information such as packets, user data, or control information associated with various information channels (e.g., control channels, data channels, and information related to flexible beamforming techniques for wireless devices, etc.). Information may be passed on to other components of the device 1605. The receiver 1610 may be an example of aspects of the transceiver 1620 described with reference to FIG. 16. The receiver 1610 may utilize a single antenna or a set of antennas.

The communications manager 1615 may be an example of aspects of the communications manager 1515 as described herein. The communications manager 1615 may include an indication receiver 1620, a parameter component 1625, a beamforming manager 1630, an array information manager 1635, a parameter manager 1640, and a communications component 1645. The communications manager 1615 may be an example of aspects of the communications manager 1610 described herein.

The indication receiver 1620 may receive, from a UE, an indication of foldable state capability information of the UE, the foldable state capability information corresponding to a state of the one or more foldable units of the UE. The parameter component 1625 may determine a beamforming parameter for beamforming communications with the UE based on the foldable state capability information. The beamforming manager 1630 may perform a beamforming communication with the UE based on the beamforming parameter. The array information manager 1635 may receive, from a UE, an indication of antenna array information of the UE, the antenna array information corresponding to multiple antenna arrays of the UE. The parameter manager 1640 may determine a beamforming parameter for beamforming communications with the UE based on the antenna array information. The communications component 1645 may perform a beamforming communication with the UE based on the beamforming parameter. The transmitter 1650 may transmit signals generated by other components of the device 1605. In some examples, the transmitter 1650 may be collocated with a receiver 1610 in a transceiver module. For example, the transmitter 1650 may be an example of aspects of the transceiver 1620 described with reference to FIG. 16. The transmitter 1650 may utilize a single antenna or a set of antennas.

Figure 17:
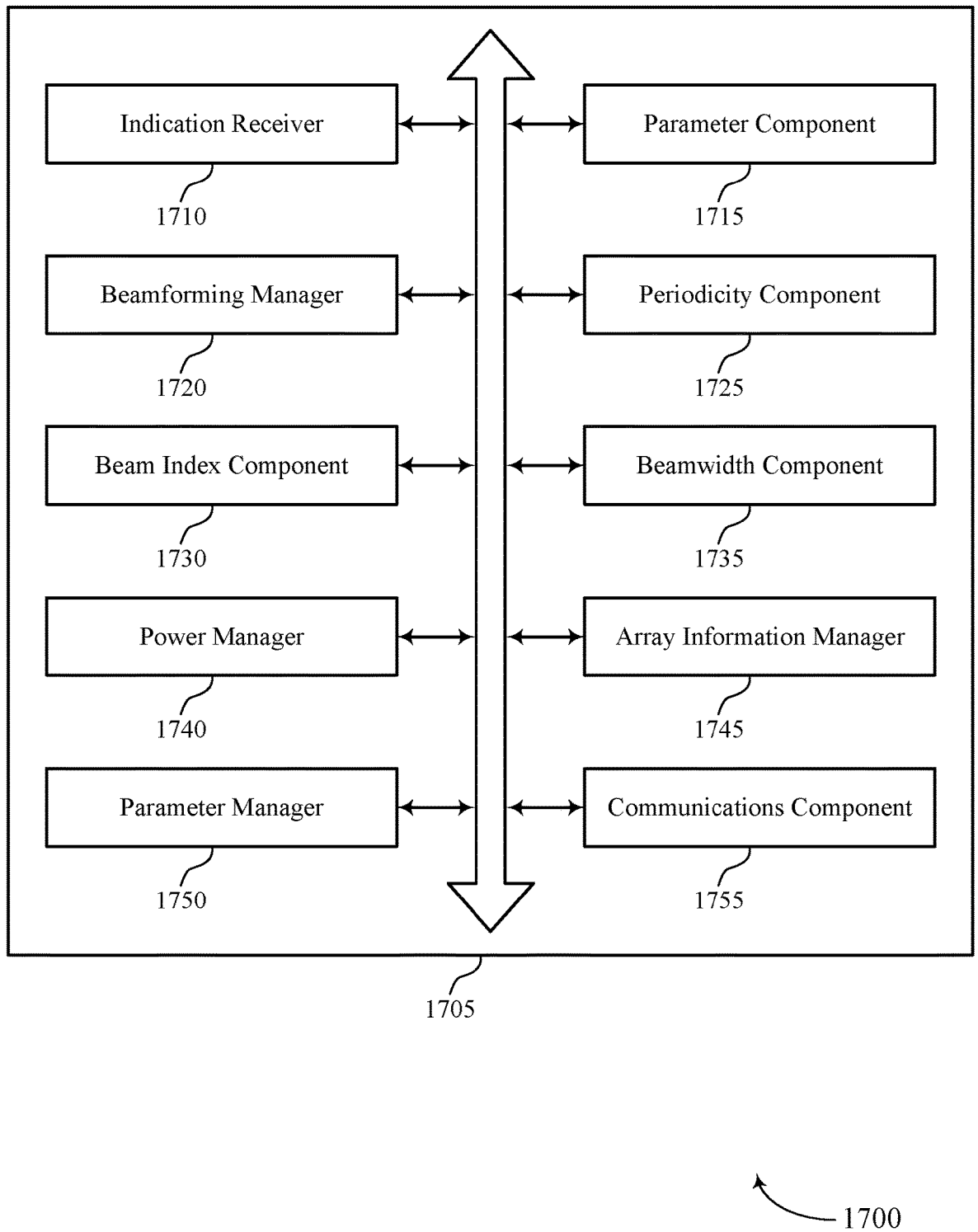
FIG. 17 shows a block diagram of a communications manager that supports flexible beamforming techniques for wireless devices in accordance with one or more aspects of the present disclosure.

FIG. 17 shows a block diagram 1700 of a communications manager 1705 that supports flexible beamforming techniques for wireless devices in accordance with one or more aspects of the present disclosure. The communications manager 1705 may be an example of aspects of a communications manager 1515, a communications manager 1615, or a communications manager 1610 described herein. The communications manager 1705 may include an indication receiver 1710, a parameter component 1715, a beamforming manager 1720, a periodicity component 1725, a beam index component 1730, a beamwidth component 1735, a power manager 1740, an array information manager 1745, a parameter manager 1750, and a communications component 1755. Each of these modules may communicate, directly or indirectly, with one another (e.g., via one or more buses).

The indication receiver 1710 may receive, from a UE, an indication of foldable state capability information of the UE, the foldable state capability information corresponding to a state of the one or more foldable units of the UE.

The parameter component 1715 may determine a beamforming parameter for beamforming communications with the UE based on the foldable state capability information.

The beamforming manager 1720 may perform a beamforming communication with the UE based on the beamforming parameter. In some examples, the beamforming manager 1720 may receive the beamformed communication from the UE according to a beamwidth used by the UE, the beamwidth for use by the base station is determined based on the beamwidth used by the UE. In some cases, the beamforming manager 1720 may transmit the beamforming communication via the at least one beam in accordance with the transmit power.

The array information manager 1745 may receive, from a UE, an indication of antenna array information of the UE, the antenna array information corresponding to multiple antenna arrays of the UE. In some examples, the array information manager 1745 may identify a set of active antenna arrays of the UE for beamforming communications based on the antenna array information.

The parameter manager 1750 may determine a beamforming parameter for beamforming communications with the UE based on the antenna array information. In some examples, the parameter manager 1750 may determine the beamforming parameter based on the set of active antenna arrays.

The communications component 1755 may perform a beamforming communication with the UE based on the beamforming parameter.

The periodicity component 1725 may determine a periodicity for a set of reference signals of a beam training process for the UE. In some examples, the periodicity component 1725 may transmit an indication of the periodicity for the set of reference signals to of the beam training process to the UE. In some cases, the periodicity component 1725 may increase or decreasing the periodicity of the set of reference signals with respect to a current or previous periodicity of the set of reference signals. In some instances, the set of reference signals includes a set of CSI-RSs. In some aspects, the indication of the periodicity is transmitted to the UE via a downlink control channel.

The beam index component 1730 may a set of beam indices or a number of beams for use at the UE in beamforming communications with the UE, where determining the number of beams comprises determining a hierarchy of the number of beams. In some examples, the beam index component 1730 may transmit an indication of the set of beam indices or the number of beams to the UE. In some cases, the beam index component 1730 may determine a set of beam indices for use at the base station in beamforming communications with the UE, where the beamforming communication is performed based on the set of beam indices of the number of beams, where the determination of the number of beams comprises determining a hierarchy of the number of beams. The beam index component 1730 may adjust a codebook associated with the number of beams, the beam indices, or the hierarchy of the number of beams, or a combination thereof.

The beamwidth component 1735 may determine a beamwidth of a beam for use at the UE in beamforming communications with the UE. In some examples, the beamwidth component 1735 may transmit an indication of the beamwidth of the beam to the UE. In some cases, the beamwidth component 1735 may determine a beamwidth of a beam for use at the base station in beamforming communications with the UE, where the beamforming communication is performed based on the beamwidth. The beamwidth component 1735 may adjust a codebook associated with the beamforming of the beam.

The power manager 1740 may determine a transmit power for at least one beam for beamforming communications with the UE. In some examples, the power manager 1740 may determine respective transmit powers for each of a set of beams for beamforming communications with the UE.

Figure 18:
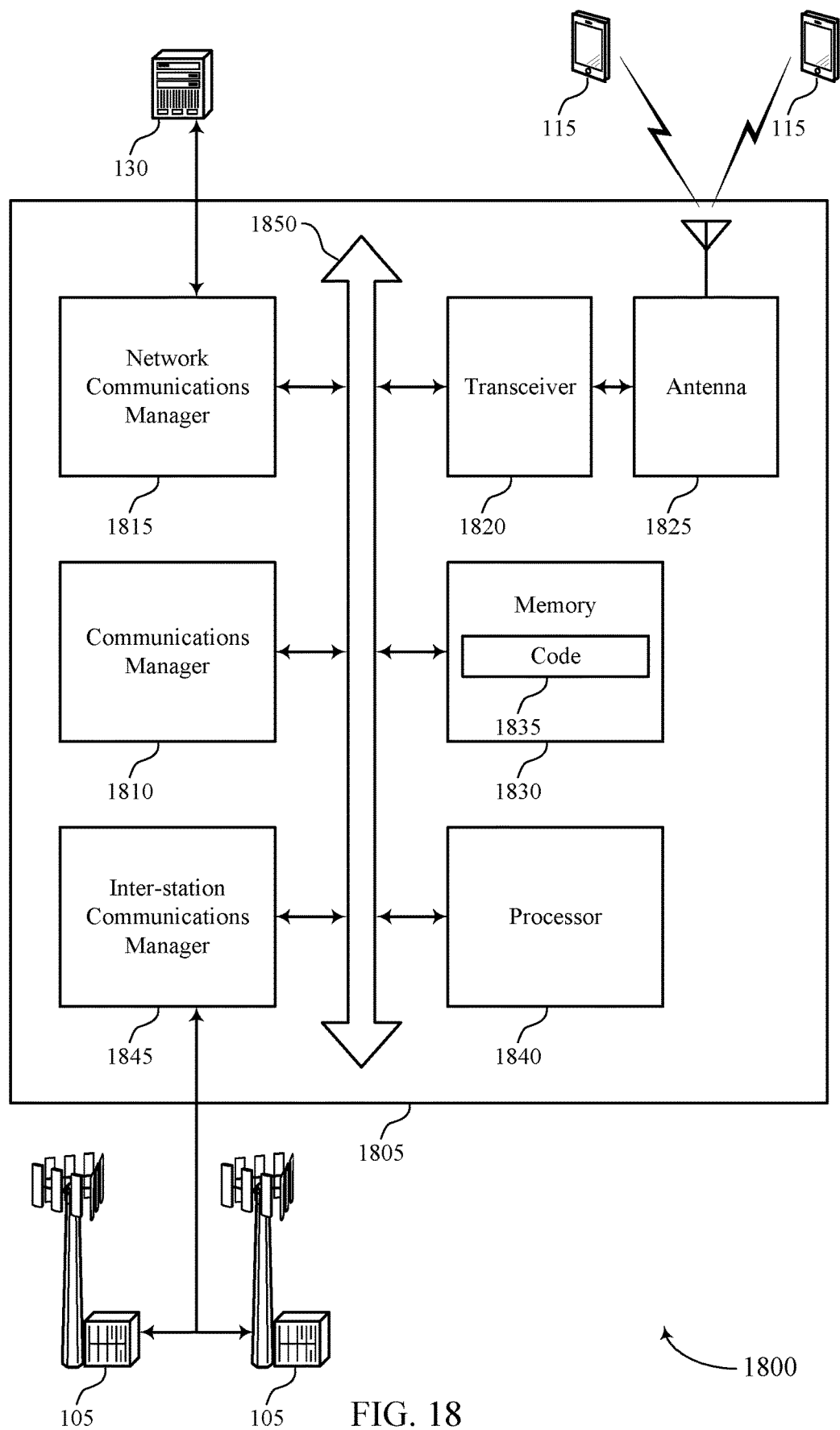
FIG. 18 shows a diagram of a system including a device that supports flexible beamforming techniques for wireless devices in accordance with one or more aspects of the present disclosure.

FIG. 18 shows a diagram of a system 1800 including a device 1805 that supports flexible beamforming techniques for wireless devices in accordance with one or more aspects of the present disclosure. The device 1805 may be an example of or include the components of device 1505, device 1605, or a network device (e.g., a base station) as described herein. The device 1805 may include components for bi-directional voice and data communications including components for transmitting and receiving communications, including a communications manager 1810, a network communications manager 1815, a transceiver 1820, an antenna 1825, memory 1830, a processor 1840, and an inter-station communications manager 1845. These components may be in electronic communication via one or more buses (e.g., bus 1850).

The communications manager 1810 may receive, from a UE, an indication of foldable state capability information of the UE, the foldable state capability information corresponding to a state of the one or more foldable units of the UE, determine a beamforming parameter for beamforming communications with the UE based on the foldable state capability information, and perform a beamforming communication with the UE based on the beamforming parameter.

The communications manager 1810 may also receive, from a UE, an indication of antenna array information of the UE, the antenna array information corresponding to multiple antenna arrays of the UE, determine a beamforming parameter for beamforming communications with the UE based on the antenna array information, and perform a beamforming communication with the UE based on the beamforming parameter.

The network communications manager 1815 may manage communications with the core network (e.g., via one or more wired backhaul links). For example, the network communications manager 1815 may manage the transfer of data communications for client devices, such as one or more UEs 115.

The transceiver 1820 may communicate bi-directionally, via one or more antennas, wired, or wireless links as described herein. For example, the transceiver 1820 may represent a wireless transceiver and may communicate bi-directionally with another wireless transceiver. The transceiver 1820 may also include a modem to modulate the packets and provide the modulated packets to the antennas for transmission, and to demodulate packets received from the antennas.

In some cases, the device 1805 may include a single antenna 1825, or the device 1805 may have more than one antenna 1825, which may be capable of concurrently transmitting or receiving multiple wireless transmissions.

The memory 1830 may include RAM, ROM, or a combination thereof. The memory 1830 may store computer-readable code 1835 including instructions that, when executed by a processor (e.g., the processor 1840) cause the device to perform various functions described herein. In some cases, the memory 1830 may contain, among other things, a BIOS which may control basic hardware or software operation such as the interaction with peripheral components or devices.

The processor 1840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some cases, a memory controller may be integrated into processor 1840. The processor 1840 may be configured to execute computer-readable instructions stored in a memory (e.g., the memory 1830) to cause the device 1805 to perform various functions (e.g., functions or tasks supporting flexible beamforming techniques for wireless devices).

The inter-station communications manager 1845 may manage communications with other base stations 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communication network technology to provide communication between base stations 105.

The code 1835 may include instructions to implement aspects of the present disclosure, including instructions to support wireless communications. The code 1835 may be stored in a non-transitory computer-readable medium such as system memory or other type of memory. In some cases, the code 1835 may not be directly executable by the processor 1840 but may cause a computer (e.g., when compiled and executed) to perform functions described herein.

Figure 19:
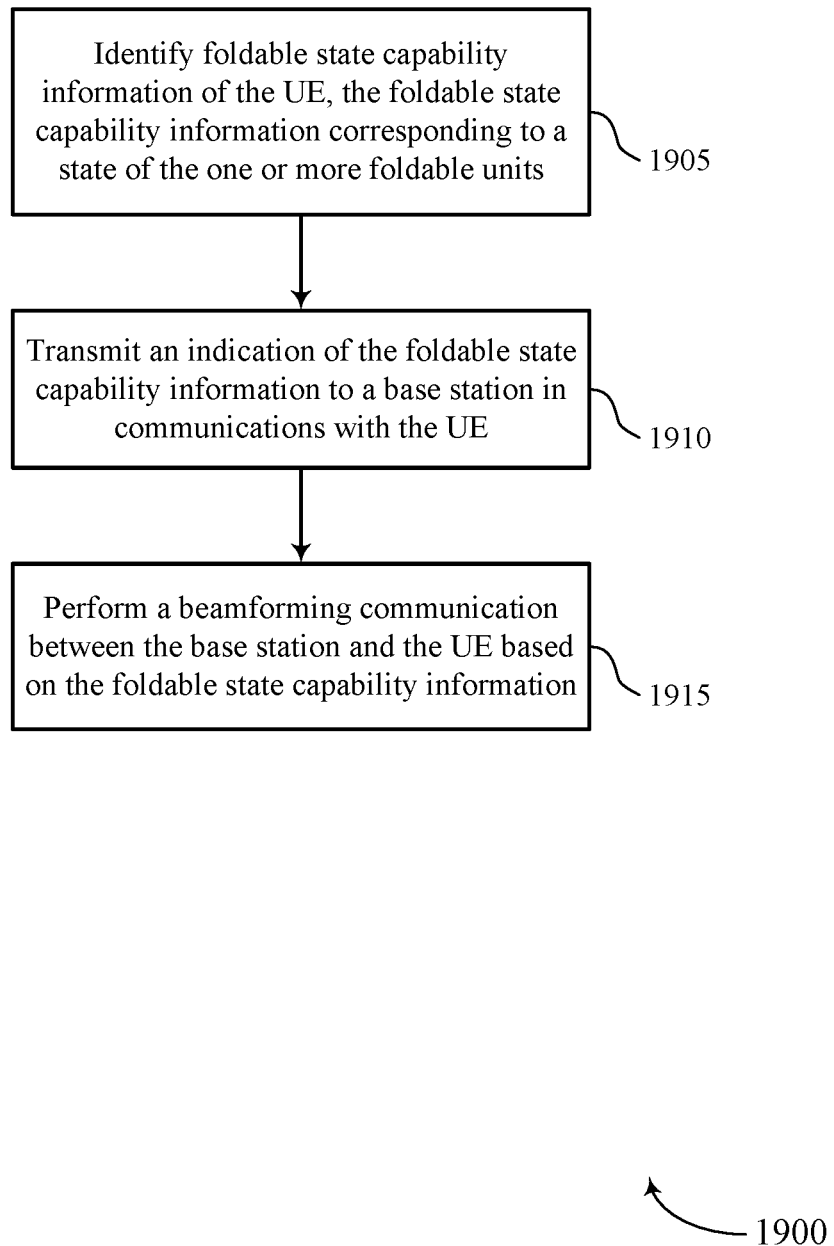
FIGS. 19 through 27 show flowcharts illustrating methods that support flexible beamforming techniques for wireless devices in accordance with one or more aspects of the present disclosure.

FIG. 19 shows a flowchart illustrating a method 1900 that supports flexible beamforming techniques for wireless devices in accordance with one or more aspects of the present disclosure. The operations of method 1900 may be implemented by a UE 115 or its components as described herein. For example, the operations of method 1900 may be performed by a communications manager as described with reference to FIGS. 11 through 14. In some examples, a UE may execute a set of instructions to control the functional elements of the UE to perform the functions described herein. Additionally or alternatively, a UE may perform aspects of the functions described herein using special-purpose hardware.

At 1905, the UE may identify foldable state capability information of the UE, the foldable state capability information corresponding to a state of the one or more foldable units. The operations of 1905 may be performed according to the methods described herein. In some examples, aspects of the operations of 1905 may be performed by a capability identifier as described with reference to FIGS. 11 through 14.

At 1910, the UE may transmit an indication of the foldable state capability information to a base station in communications with the UE. The operations of 1910 may be performed according to the methods described herein. In some examples, aspects of the operations of 1910 may be performed by an indication transmitter as described with reference to FIGS. 11 through 14.

At 1915, the UE may perform a beamforming communication between the base station and the UE based on the foldable state capability information. The operations of 1915 may be performed according to the methods described herein. In some examples, aspects of the operations of 1915 may be performed by a beamforming component as described with reference to FIGS. 11 through 14.

Figure 20:
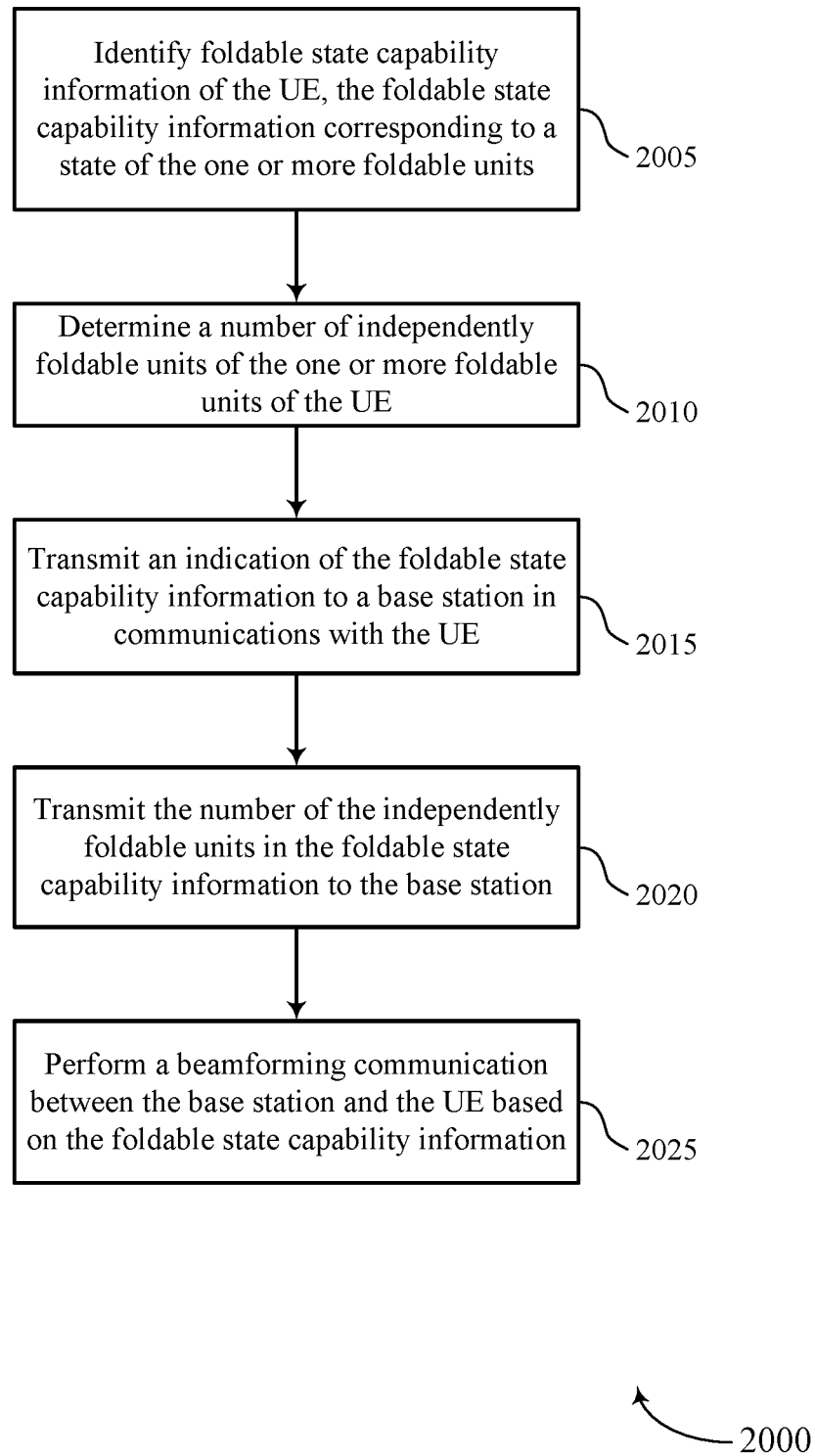

FIG. 20 shows a flowchart illustrating a method 2000 that supports flexible beamforming techniques for wireless devices in accordance with one or more aspects of the present disclosure. The operations of method 2000 may be implemented by a UE 115 or its components as described herein. For example, the operations of method 2000 may be performed by a communications manager as described with reference to FIGS. 11 through 14. In some examples, a UE may execute a set of instructions to control the functional elements of the UE to perform the functions described herein. Additionally or alternatively, a UE may perform aspects of the functions described herein using special-purpose hardware.

At 2005, the UE may identify foldable state capability information of the UE, the foldable state capability information corresponding to a state of the one or more foldable units. The operations of 2005 may be performed according to the methods described herein. In some examples, aspects of the operations of 2005 may be performed by a capability identifier as described with reference to FIGS. 11 through 14.

At 2010, the UE may determine a number of independently foldable units of the one or more foldable units of the UE. The operations of 2010 may be performed according to the methods described herein. In some examples, aspects of the operations of 2010 may be performed by a capability identifier as described with reference to FIGS. 11 through 14.

At 2015, the UE may transmit an indication of the foldable state capability information to a base station in communications with the UE. The operations of 2015 may be performed according to the methods described herein. In some examples, aspects of the operations of 2015 may be performed by an indication transmitter as described with reference to FIGS. 11 through 14.

At 2020, the UE may transmit the number of the independently foldable units in the foldable state capability information to the base station. The operations of 2020 may be performed according to the methods described herein. In some examples, aspects of the operations of 2020 may be performed by an indication transmitter as described with reference to FIGS. 11 through 14.

At 2025, the UE may perform a beamforming communication between the base station and the UE based on the foldable state capability information. The operations of 2025 may be performed according to the methods described herein. In some examples, aspects of the operations of 2025 may be performed by a beamforming component as described with reference to FIGS. 11 through 14.

Figure 21:
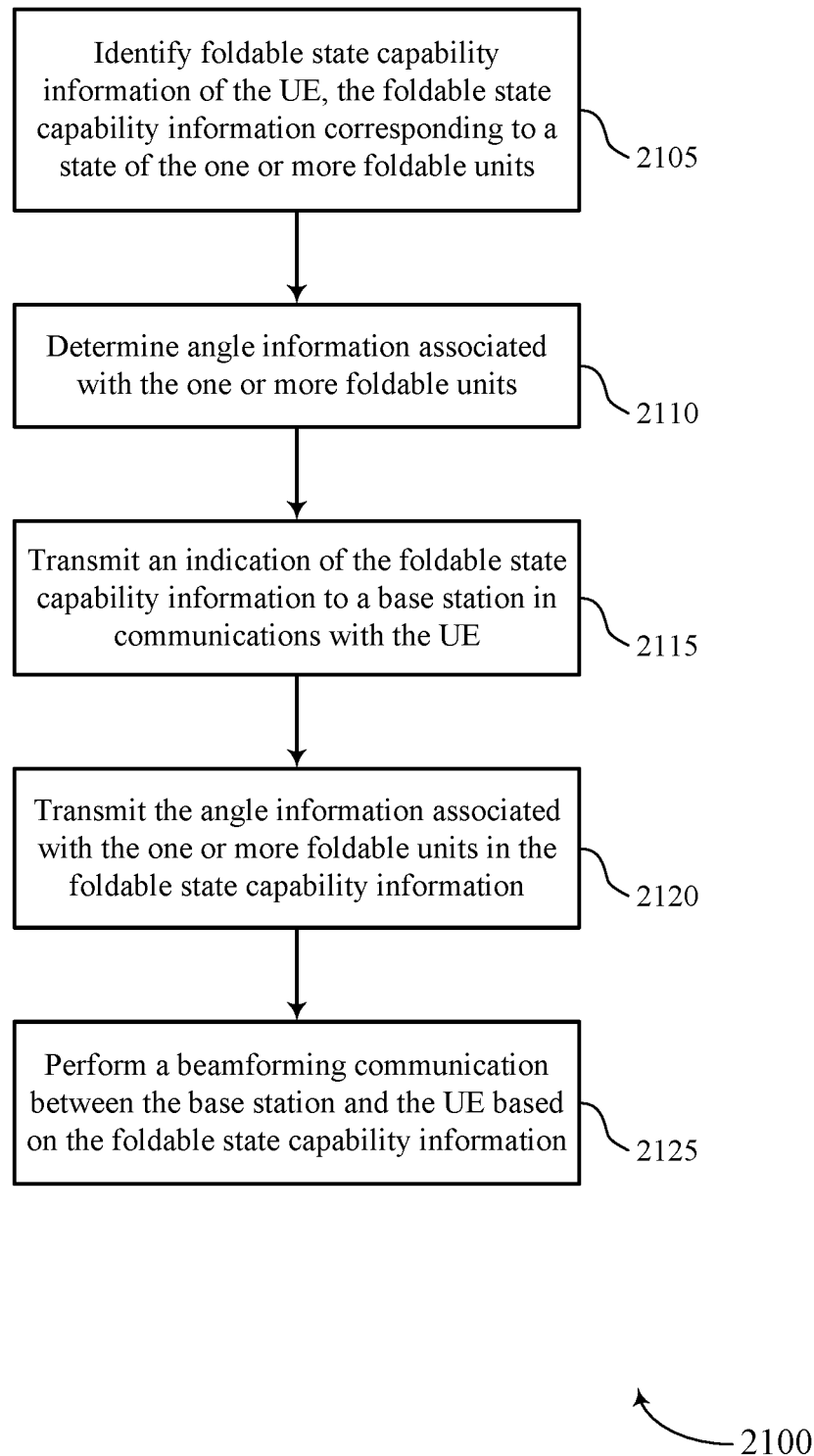

FIG. 21 shows a flowchart illustrating a method 2100 that supports flexible beamforming techniques for wireless devices in accordance with one or more aspects of the present disclosure. The operations of method 2100 may be implemented by a UE 115 or its components as described herein. For example, the operations of method 2100 may be performed by a communications manager as described with reference to FIGS. 11 through 14. In some examples, a UE may execute a set of instructions to control the functional elements of the UE to perform the functions described herein. Additionally or alternatively, a UE may perform aspects of the functions described herein using special-purpose hardware.

At 2105, the UE may identify foldable state capability information of the UE, the foldable state capability information corresponding to a state of the one or more foldable units. The operations of 2105 may be performed according to the methods described herein. In some examples, aspects of the operations of 2105 may be performed by a capability identifier as described with reference to FIGS. 11 through 14.

At 2110, the UE may determine angle information associated with the one or more foldable units. The operations of 2110 may be performed according to the methods described herein. In some examples, aspects of the operations of 2110 may be performed by an angle manager as described with reference to FIGS. 11 through 14.

At 2115, the UE may transmit an indication of the foldable state capability information to a base station in communications with the UE. The operations of 2115 may be performed according to the methods described herein. In some examples, aspects of the operations of 2115 may be performed by an indication transmitter as described with reference to FIGS. 11 through 14.

At 2120, the UE may transmit the angle information associated with the one or more foldable units in the foldable state capability information. The operations of 2120 may be performed according to the methods described herein. In some examples, aspects of the operations of 2120 may be performed by an indication transmitter as described with reference to FIGS. 11 through 14.

At 2125, the UE may perform a beamforming communication between the base station and the UE based on the foldable state capability information. The operations of 2125 may be performed according to the methods described herein. In some examples, aspects of the operations of 2125 may be performed by a beamforming component as described with reference to FIGS. 11 through 14.

Figure 22:
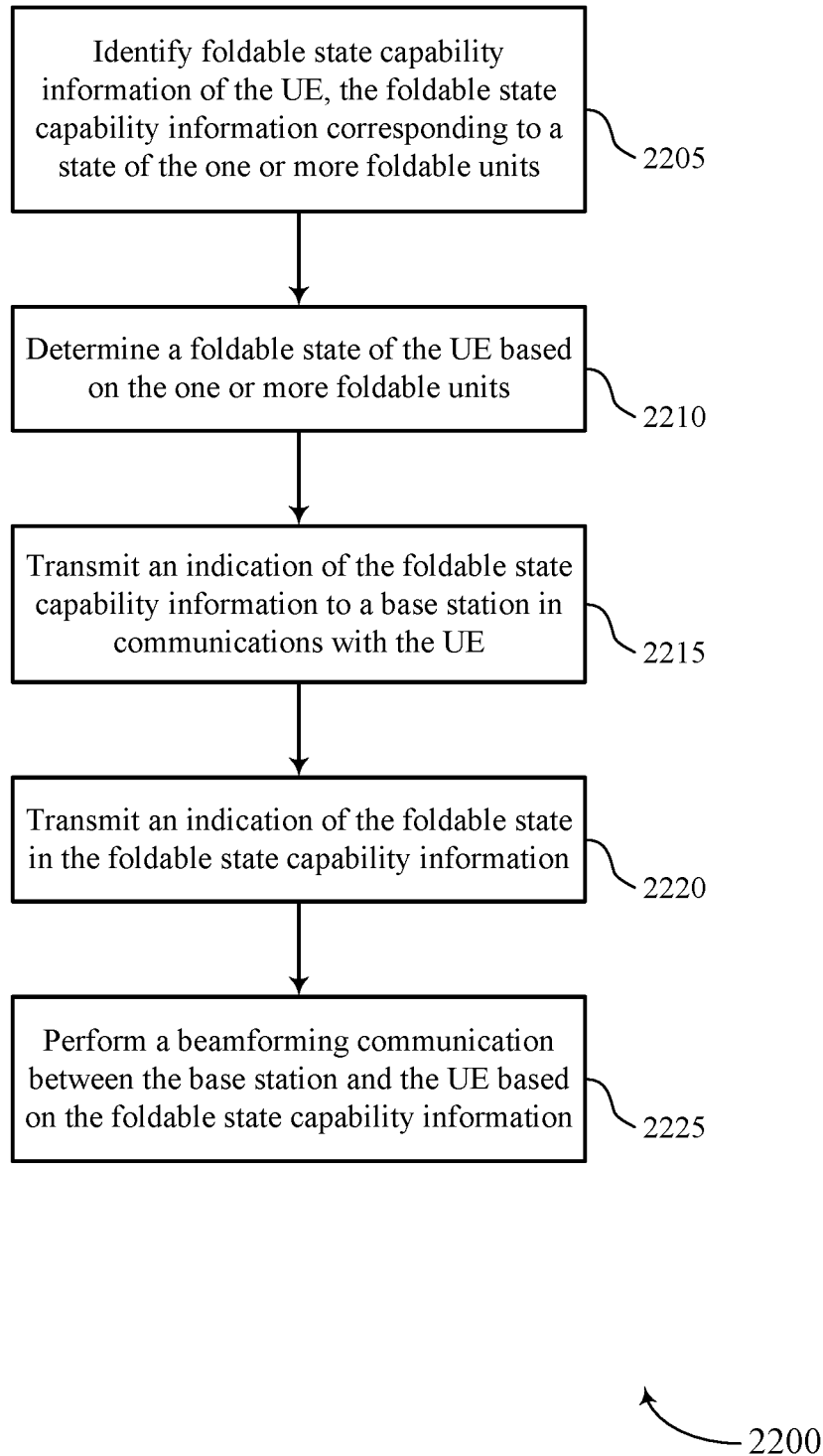

FIG. 22 shows a flowchart illustrating a method 2200 that supports flexible beamforming techniques for wireless devices in accordance with one or more aspects of the present disclosure. The operations of method 2200 may be implemented by a UE 115 or its components as described herein. For example, the operations of method 2200 may be performed by a communications manager as described with reference to FIGS. 11 through 14. In some examples, a UE may execute a set of instructions to control the functional elements of the UE to perform the functions described herein. Additionally or alternatively, a UE may perform aspects of the functions described herein using special-purpose hardware.

At 2205, the UE may identify foldable state capability information of the UE, the foldable state capability information corresponding to a state of the one or more foldable units. The operations of 2205 may be performed according to the methods described herein. In some examples, aspects of the operations of 2205 may be performed by a capability identifier as described with reference to FIGS. 11 through 14.

At 2210, the UE may determine a foldable state of the UE based on the one or more foldable units. The operations of 2210 may be performed according to the methods described herein. In some examples, aspects of the operations of 2210 may be performed by a foldable state manager as described with reference to FIGS. 11 through 14.

At 2215, the UE may transmit an indication of the foldable state capability information to a base station in communications with the UE. The operations of 2215 may be performed according to the methods described herein. In some examples, aspects of the operations of 2215 may be performed by an indication transmitter as described with reference to FIGS. 11 through 14.

At 2220, the UE may transmit an indication of the foldable state in the foldable state capability information. The operations of 2220 may be performed according to the methods described herein. In some examples, aspects of the operations of 2220 may be performed by an indication transmitter as described with reference to FIGS. 11 through 14.

At 2225, the UE may perform a beamforming communication between the base station and the UE based on the foldable state capability information. The operations of 2225 may be performed according to the methods described herein. In some examples, aspects of the operations of 2225 may be performed by a beamforming component as described with reference to FIGS. 11 through 14.

Figure 23:
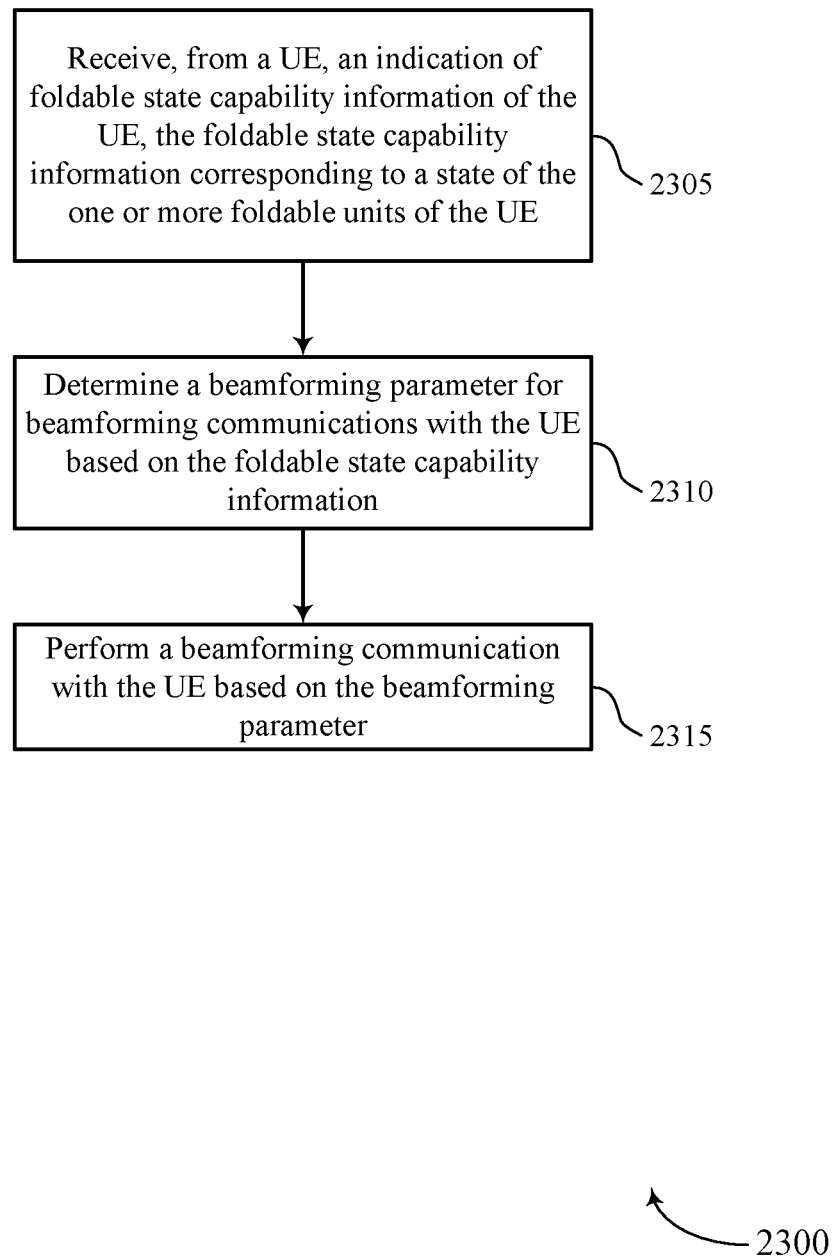

FIG. 23 shows a flowchart illustrating a method 2300 that supports flexible beamforming techniques for wireless devices in accordance with one or more aspects of the present disclosure. The operations of method 2300 may be implemented by a network device (e.g., a base station) or its components as described herein. For example, the operations of method 2300 may be performed by a communications manager as described with reference to FIGS. 15 through 18. In some examples, a base station may execute a set of instructions to control the functional elements of the base station to perform the functions described herein. Additionally or alternatively, a base station may perform aspects of the functions described herein using special-purpose hardware.

At 2305, the base station may receive, from a UE, an indication of foldable state capability information of the UE, the foldable state capability information corresponding to a state of the one or more foldable units of the UE. The operations of 2305 may be performed according to the methods described herein. In some examples, aspects of the operations of 2305 may be performed by an indication receiver as described with reference to FIGS. 15 through 18.

At 2310, the base station may determine a beamforming parameter for beamforming communications with the UE based on the foldable state capability information. The operations of 2310 may be performed according to the methods described herein. In some examples, aspects of the operations of 2310 may be performed by a parameter component as described with reference to FIGS. 15 through 18.

At 2315, the base station may perform a beamforming communication with the UE based on the beamforming parameter. The operations of 2315 may be performed according to the methods described herein. In some examples, aspects of the operations of 2315 may be performed by a beamforming manager as described with reference to FIGS. 15 through 18.

Figure 24:
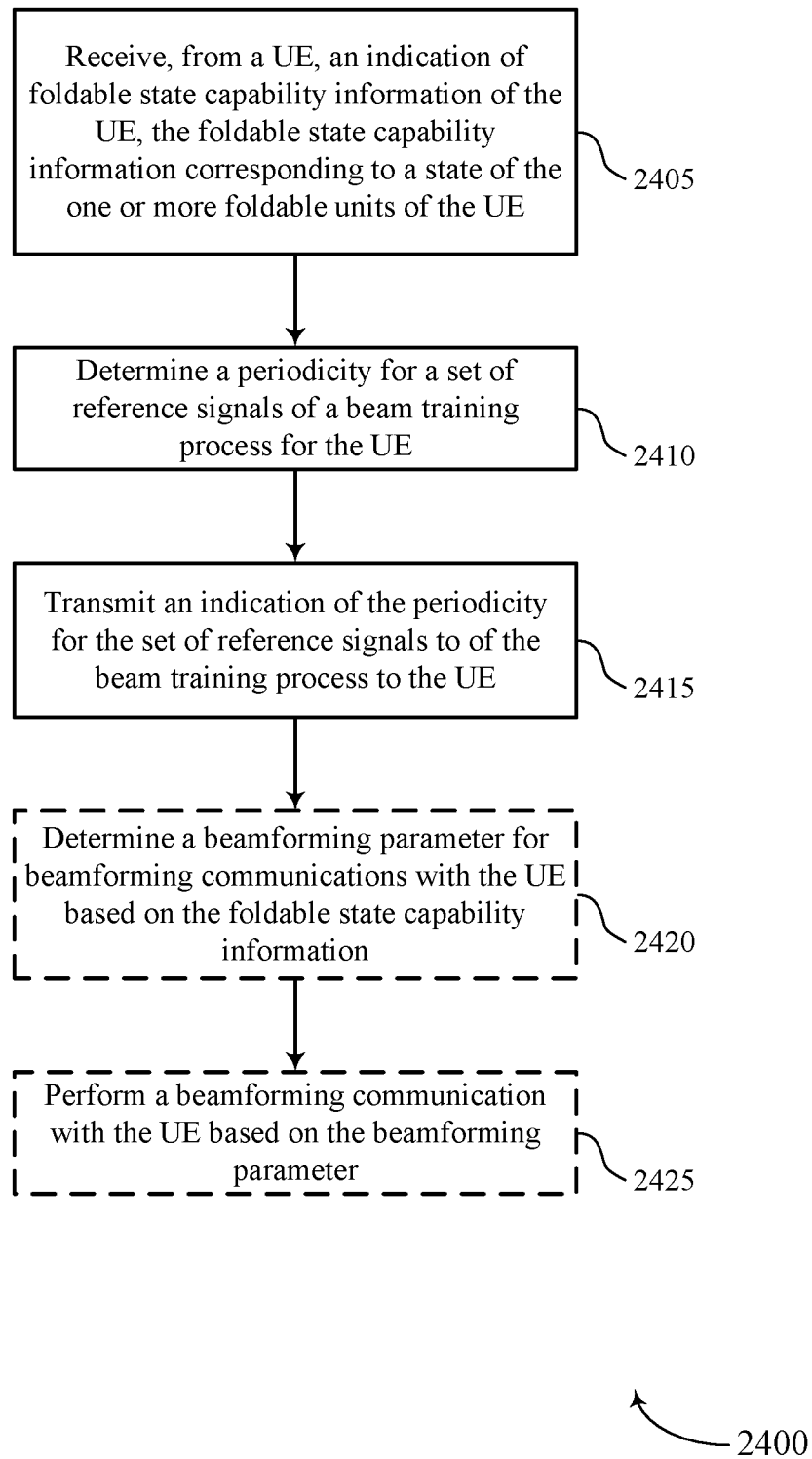

FIG. 24 shows a flowchart illustrating a method 2400 that supports flexible beamforming techniques for wireless devices in accordance with one or more aspects of the present disclosure. The operations of method 2400 may be implemented by a network device (e.g., a base station) or its components as described herein. For example, the operations of method 2400 may be performed by a communications manager as described with reference to FIGS. 15 through 18. In some examples, a base station may execute a set of instructions to control the functional elements of the base station to perform the functions described herein. Additionally or alternatively, a base station may perform aspects of the functions described herein using special-purpose hardware.

At 2405, the base station may receive, from a UE, an indication of foldable state capability information of the UE, the foldable state capability information corresponding to a state of the one or more foldable units of the UE. The operations of 2405 may be performed according to the methods described herein. In some examples, aspects of the operations of 2405 may be performed by an indication receiver as described with reference to FIGS. 15 through 18.

At 2410, the base station may determine a periodicity for a set of reference signals of a beam training process for the UE (e.g., based on the foldable state capability information of the UE). The operations of 2410 may be performed according to the methods described herein. In some examples, aspects of the operations of 2410 may be performed by a periodicity component as described with reference to FIGS. 15 through 18.

At 2415, the base station may transmit an indication of the periodicity for the set of reference signals to of the beam training process to the UE. The operations of 2415 may be performed according to the methods described herein. In some examples, aspects of the operations of 2415 may be performed by a periodicity component as described with reference to FIGS. 15 through 18.

Optionally, at 2420, the base station may determine a beamforming parameter for beamforming communications with the UE based on the foldable state capability information. The operations of 2420 may be performed according to the methods described herein. In some examples, aspects of the operations of 2420 may be performed by a parameter component as described with reference to FIGS. 15 through 18.

Optionally, at 2425, the base station may perform a beamforming communication with the UE based on the beamforming parameter. The operations of 2425 may be performed according to the methods described herein. In some examples, aspects of the operations of 2425 may be performed by a beamforming manager as described with reference to FIGS. 15 through 18.

Figure 25:
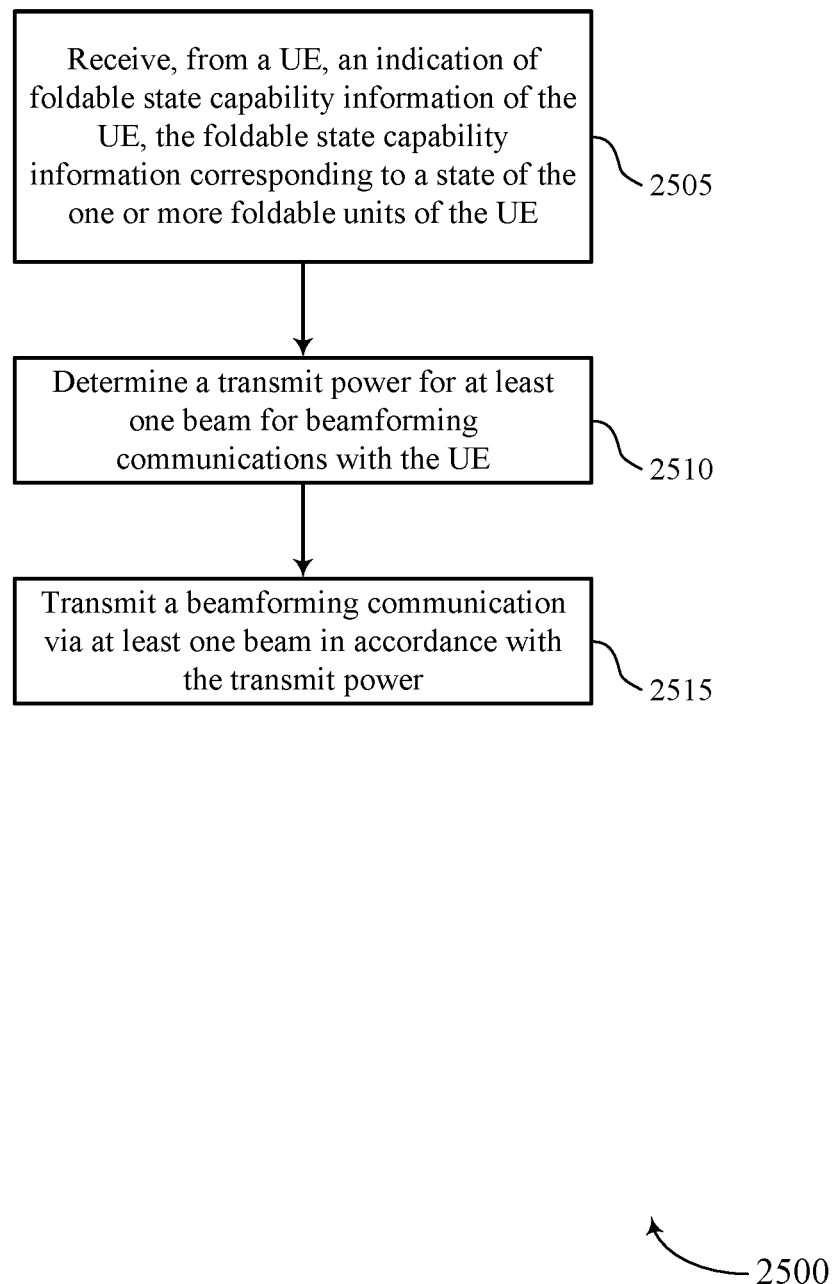

FIG. 25 shows a flowchart illustrating a method 2500 that supports flexible beamforming techniques for wireless devices in accordance with one or more aspects of the present disclosure. The operations of method 2500 may be implemented by a network device (e.g., a base station) or its components as described herein. For example, the operations of method 2500 may be performed by a communications manager as described with reference to FIGS. 15 through 18. In some examples, a base station may execute a set of instructions to control the functional elements of the base station to perform the functions described herein. Additionally or alternatively, a base station may perform aspects of the functions described herein using special-purpose hardware.

At 2505, the base station may receive, from a UE, an indication of foldable state capability information of the UE, the foldable state capability information corresponding to a state of the one or more foldable units of the UE. The operations of 2505 may be performed according to the methods described herein. In some examples, aspects of the operations of 2505 may be performed by an indication receiver as described with reference to FIGS. 15 through 18.

At 2510, the base station may determine a transmit power for at least one beam for beamforming communications with the UE (e.g., based on the foldable state capability information). The operations of 2510 may be performed according to the methods described herein. In some examples, aspects of the operations of 2510 may be performed by a power manager as described with reference to FIGS. 15 through 18.

At 2515, the base station may transmit a beamforming communication via at least one beam in accordance with the transmit power. The operations of 2515 may be performed according to the methods described herein. In some examples, aspects of the operations of 2515 may be performed by a beamforming manager as described with reference to FIGS. 15 through 18.

Figure 26:
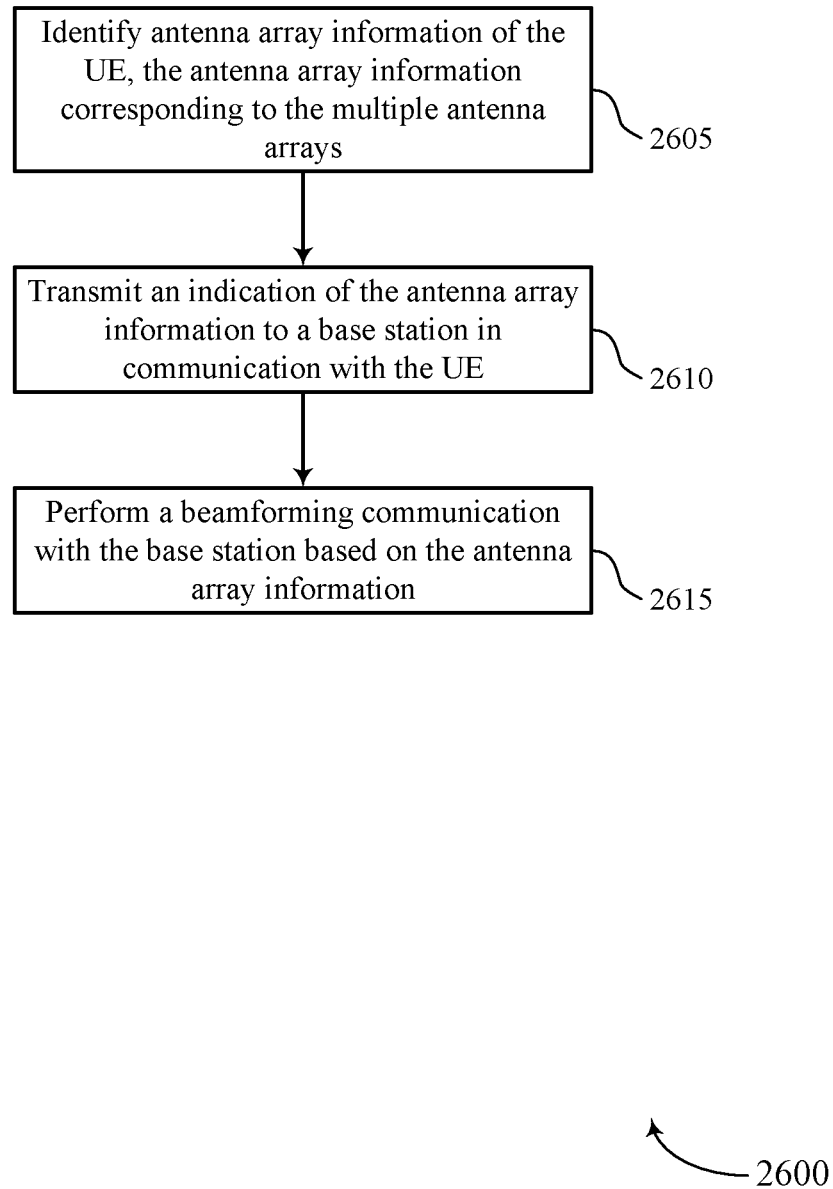

FIG. 26 shows a flowchart illustrating a method 2600 that supports flexible beamforming techniques for wireless devices in accordance with one or more aspects of the present disclosure. The operations of method 2600 may be implemented by a UE 115 or its components as described herein. For example, the operations of method 2600 may be performed by a communications manager as described with reference to FIGS. 11 through 14. In some examples, a UE may execute a set of instructions to control the functional elements of the UE to perform the functions described herein. Additionally or alternatively, a UE may perform aspects of the functions described herein using special-purpose hardware.

At 2605, the UE may identify antenna array information of the UE, the antenna array information corresponding to the multiple antenna arrays. The operations of 2605 may be performed according to the methods described herein. In some examples, aspects of the operations of 2605 may be performed by an array information component as described with reference to FIGS. 11 through 14.

At 2610, the UE may transmit an indication of the antenna array information to a base station in communication with the UE. The operations of 2610 may be performed according to the methods described herein. In some examples, aspects of the operations of 2610 may be performed by an array transmitter as described with reference to FIGS. 11 through 14.

At 2615, the UE may perform a beamforming communication with the base station based on the antenna array information. The operations of 2615 may be performed according to the methods described herein. In some examples, aspects of the operations of 2615 may be performed by a communications component as described with reference to FIGS. 11 through 14.

Figure 27:
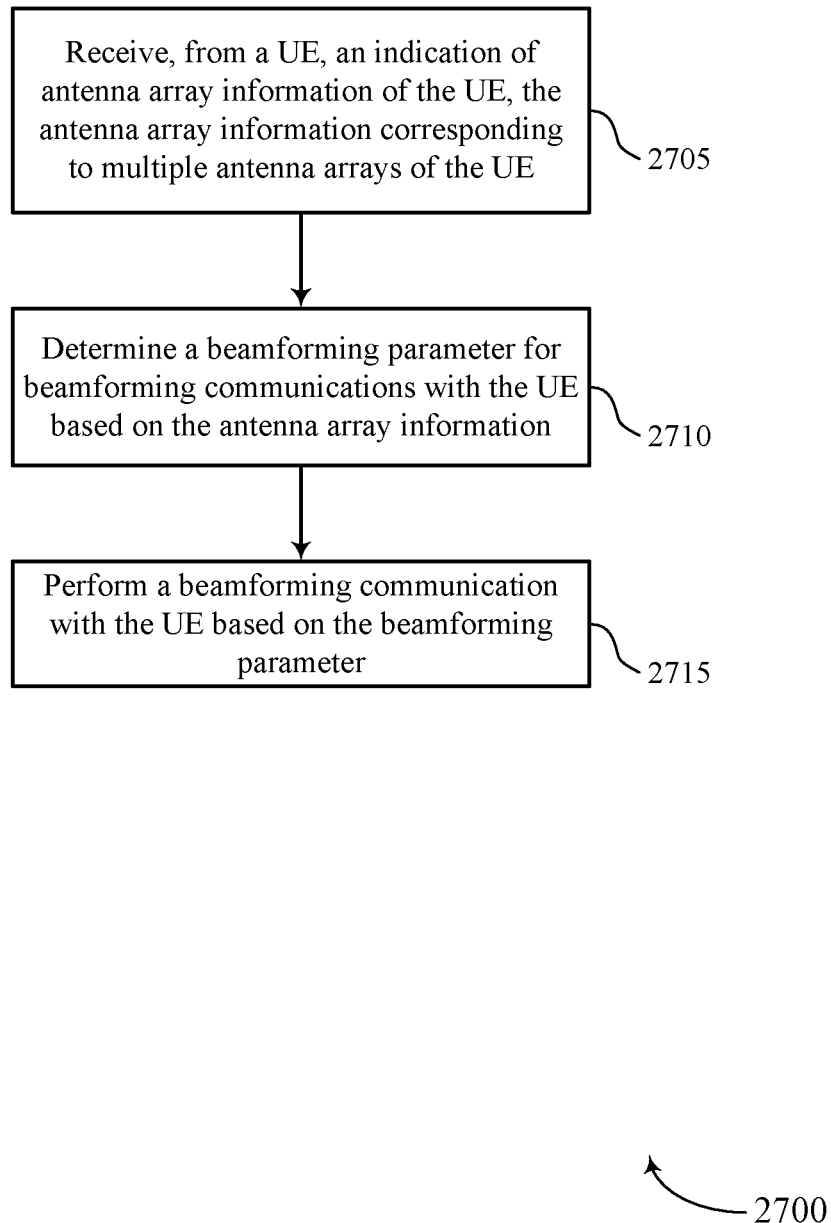

FIG. 27 shows a flowchart illustrating a method 2700 that supports flexible beamforming techniques for wireless devices in accordance with one or more aspects of the present disclosure. The operations of method 2700 may be implemented by a network device (e.g., a base station) or its components as described herein. For example, the operations of method 2700 may be performed by a communications manager as described with reference to FIGS. 15 through 18. In some examples, a base station may execute a set of instructions to control the functional elements of the base station to perform the functions described herein. Additionally or alternatively, a base station may perform aspects of the functions described herein using special-purpose hardware.

At 2705, the base station may receive, from a UE, an indication of antenna array information of the UE, the antenna array information corresponding to multiple antenna arrays of the UE. The operations of 2705 may be performed according to the methods described herein. In some examples, aspects of the operations of 2705 may be performed by an array information manager as described with reference to FIGS. 15 through 18.

At 2710, the base station may determine a beamforming parameter for beamforming communications with the UE based on the antenna array information. The operations of 2710 may be performed according to the methods described herein. In some examples, aspects of the operations of 2710 may be performed by a parameter manager as described with reference to FIGS. 15 through 18.

At 2715, the base station may perform a beamforming communication with the UE based on the beamforming parameter. The operations of 2715 may be performed according to the methods described herein. In some examples, aspects of the operations of 2715 may be performed by a communications component as described with reference to FIGS. 15 through 18.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous examples or aspects described herein.

Example 1

A method of wireless communications at a UE having one or more foldable units is described. The method may include identifying foldable state capability information of the UE, the foldable state capability information corresponding to a state of the one or more foldable units, transmitting an indication of the foldable state capability information to a base station in communications with the UE, and performing a beamforming communication between the base station and the UE based on the foldable state capability information.

Example 2

The method of example 1, further comprising: determining a number of independently foldable units of the one or more foldable units of the UE, and transmitting the number of the independently foldable units in the foldable state capability information to the base station.

Example 3

The method of any of examples 1 and 2, further comprising: determining angle information associated with the one or more foldable units, and transmitting the angle information associated with the one or more foldable units in the foldable state capability information.

Example 4

The method of any of examples 1 to 3, further comprising: determining identifying an angle separation between a first antenna array of a first foldable unit of the one or more foldable units and a second antenna array of a second foldable unit of the one or more foldable units.

Example 5

The method of any of examples 1 to 4, further comprising: obtaining relative positioning information from one or more sensors of the UE with respect to a reference direction, and determining an angle between two or more antenna arrays of the one or more foldable units based on the relative positioning information.

Example 6

The method of any of examples 1 to 5, further comprising: receiving the beamformed communication according to a beamwidth used by the base station based on the foldable state capability information, and adjusting a beamwidth used by the UE based on the beamwidth used by the base station.

Example 7

The method of any of examples 1 to 6, further comprising: determining a foldable state of the UE based on the one or more foldable units, and transmitting an indication of the foldable state in the foldable state capability information.

Example 8

The method of any of examples 1 to 7, wherein: the foldable state of the UE includes a single quantized state from a set of quantized states associated with the UE.

Example 9

The method of any of examples 1 to 8, wherein: the foldable state of the UE includes an indication for one of a folded state, one or more partially open states, a fully open state, or a flat state.

Example 10

The method of any of examples 1 to 9, wherein: the foldable state of the UE may be associated with a 0 degree angle, a 90 degree angle, a 180 degree angle, or an intermediate angle between two or more of the one or more foldable units.

Example 11

The method of any of examples 1 to 10, further comprising: including the indication of the foldable state capability information in a UE capability message.

Example 12

The method of any of examples 1 to 11, further comprising: configuring a set of receive antenna arrays of the UE based on the foldable state capability information, and receiving a beamformed signal from the base station via the configured set of receive antenna arrays.

Example 13

The method of any of examples 1 to 12, further comprising: configuring a set of transmit antenna arrays of the UE based on the foldable state capability information, and transmitting a beamformed signal to the base station via the configured set of transmit antenna arrays.

Example 14

An apparatus for wireless communications comprising at least one means for performing a method of any of examples 1 to 13.

Example 15

An apparatus for wireless communications comprising a processor; memory coupled to the processor; and instructions stored in the memory and executable by the processor to cause the apparatus to perform a method of any of examples 1 to 13.

Example 16

A non-transitory computer-readable medium storing code for wireless communications, the code comprising instructions executable by a processor to perform a method of any of examples 1 to 13.

Example 17

A method of wireless communications at a base station is described. The method may include receiving, from a UE, an indication of foldable state capability information of the UE, the foldable state capability information corresponding to a state of the one or more foldable units of the UE, determining a beamforming parameter for beamforming communications with the UE based on the foldable state capability information, and performing a beamforming communication with the UE based on the beamforming parameter.

Example 18

The method of example 17, wherein: the one or more foldable units may include a rollable folding display or an extendable display.

Example 19

The method of any of examples 17 and 18, further comprising: determining a periodicity for a set of reference signals of a beam training process for the UE, and transmitting an indication of the periodicity for the set of reference signals to of the beam training process to the UE.

Example 20

The method of any of examples 17 to 19, wherein: determining the periodicity may include operations, features, means, or instructions for increasing or decreasing the periodicity of the set of reference signals with respect to a current or previous periodicity of the set of reference signals.

Example 21

The method of any of examples 17 to 20, wherein: the set of reference signals includes a set of channel state information reference signals (CSI-RSs).

Example 22

The method of any of examples 17 to 21, wherein: the indication of the periodicity may be transmitted to the UE via a downlink control channel.

Example 23

The method of any of examples 17 to 22, wherein: determining a set of beam indices or a number of beams for use at the UE in beamforming communications with the UE, where determining the number of beams comprises determining a hierarchy of the number of beams, and transmitting an indication of the set of beam indices or the number of beams to the UE.

Example 24

The method of any of examples 17 to 23, further comprising: determining a beamwidth of a beam for use at the UE in beamforming communications with the UE, and transmitting an indication of the beamwidth of the beam to the UE.

Example 25

The method of any of examples 17 to 24, further comprising: determining a set of beam indices for use at the base station in beamforming communications with the UE, where the beamforming communication may be performed based on the set of beam indices or the number of beams, where the determination of the number of beams comprises determining a hierarchy of the number of beams, and adjusting a codebook associated with the number of beams, the beam indices, or the hierarchy of the number of beams, or a combination thereof.

Example 26

The method of any of examples 17 to 25, further comprising: determining a beamwidth of a beam for use at the base station in beamforming communications with the UE, where the beamforming communication may be performed based on the beamwidth, and adjusting a codebook associated with the beamforming of the beam.

Example 27

The method of any of examples 17 to 26, further comprising: receiving the beamformed communication from the UE according to a beamwidth used by the UE, where the beamwidth for use by the base station may be determined based on the beamwidth used by the UE.

Example 28

The method of any of examples 17 to 27, wherein: determining the beamforming parameter may include operations, features, means, or instructions for determining a transmit power for at least one beam for beamforming communications with the UE.

Example 29

The method of any of examples 17 to 28, further comprising: determining respective transmit powers for each of a set of beams for beamforming communications with the UE.

Example 30

The method of any of examples 17 to 29, wherein: performing the beamforming communication with the UE may include operations, features, means, or instructions for transmitting the beamforming communication via the at least one beam in accordance with the transmit power.

Example 31

An apparatus comprising at least one means for performing a method of any of examples 17 to 29.

Example 32

An apparatus for wireless communications comprising a processor; memory coupled to the processor; and instructions stored in the memory and executable by the processor to cause the apparatus to perform a method of any of examples 17 to 29.

Example 33

A non-transitory computer-readable medium storing code for wireless communications, the code comprising instructions executable by a processor to perform a method of any of examples 17 to 29.

Example 34

A method of wireless communications at a UE having multiple antenna arrays is described. The method may include identifying antenna array information of the UE, the antenna array information corresponding to the multiple antenna arrays, transmitting an indication of the antenna array information to a base station in communication with the UE, and performing a beamforming communication with the base station based on the antenna array information.

Example 35

The method of example 34, further comprising: identifying a set of active antenna arrays for beamforming communications with the base station, and transmitting an indication of the set of active antenna arrays in the antenna array information.

Example 36

An apparatus comprising at least one means for performing a method of any of examples 34 and 35.

Example 37

An apparatus for wireless communications comprising a processor; memory coupled to the processor; and instructions stored in the memory and executable by the processor to cause the apparatus to perform a method of any of examples 34 and 35.

Example 38

A non-transitory computer-readable medium storing code for wireless communications, the code comprising instructions executable by a processor to perform a method of any of examples 34 and 35.

Example 39

A method of wireless communications at a base station is described. The method may include receiving, from a UE, an indication of antenna array information of the UE, the antenna array information corresponding to multiple antenna arrays of the UE, determining a beamforming parameter for beamforming communications with the UE based on the antenna array information, and performing a beamforming communication with the UE based on the beamforming parameter.

Example 40

The method of example 34, further comprising: identifying a set of active antenna arrays of the UE for beamforming communications based on the antenna array information, and determining the beamforming parameter based on the set of active antenna arrays.

Example 41

An apparatus comprising at least one means for performing a method of any of examples 39 and 40.

Example 42

An apparatus for wireless communications comprising a processor; memory coupled to the processor; and instructions stored in the memory and executable by the processor to cause the apparatus to perform a method of any of examples 39 and 40.

Example 43

A non-transitory computer-readable medium storing code for wireless communications, the code comprising instructions executable by a processor to perform a method of any of examples 39 and 40.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE) having one or more foldable units, comprising:
   identifying foldable state capability information of the UE, the foldable state capability information corresponding to a state of the one or more foldable units;
   transmitting an indication of the foldable state capability information to a base station in communications with the UE; and
   performing a beamforming communication between the base station and the UE based at least in part on the foldable state capability information.

2. The method of claim 1, further comprising:
   determining a number of independently foldable units of the one or more foldable units of the UE; and
   transmitting the number of the independently foldable units in the foldable state capability information to the base station.

3. The method of claim 1, further comprising:
   determining angle information associated with the one or more foldable units; and
   transmitting the angle information associated with the one or more foldable units in the foldable state capability information.

4. The method of claim 3, wherein determining the angle information comprises:
   identifying an angle separation between a first antenna array of a first foldable unit of the one or more foldable units and a second antenna array of a second foldable unit of the one or more foldable units.

5. The method of claim 3, wherein determining the angle information comprises:
   obtaining relative positioning information from one or more sensors of the UE with respect to a reference direction; and
   determining an angle between two or more antenna arrays of the one or more foldable units based at least in part on the relative positioning information.

6. The method of claim 1, further comprising:
   receiving the beamformed communication according to a beamwidth used by the base station based at least in part on the foldable state capability information; and
   adjusting a beamwidth used by the UE based at least in part on the beamwidth used by the base station.

7. The method of claim 1, further comprising:
   determining a foldable state of the UE based at least in part on the one or more foldable units; and
   transmitting an indication of the foldable state in the foldable state capability information.

8. The method of claim 7, wherein the foldable state of the UE comprises a single quantized state from a set of quantized states associated with the UE.

9. The method of claim 7, wherein the foldable state of the UE comprises an indication for one of a folded state, one or more partially open states, a fully open state, or a flat state.

10. The method of claim 7, wherein the foldable state of the UE is associated with a 0 degree angle, a 90 degree angle, a 180 degree angle, or an intermediate angle between two or more of the one or more foldable units.

11. The method of claim 1, further comprising:
    including the indication of the foldable state capability information in a UE capability message.

12. The method of claim 1, wherein performing the beamforming communication comprises:
    configuring a set of receive antenna arrays of the UE based at least in part on the foldable state capability information; and
    receiving a beamformed signal from the base station via the configured set of receive antenna arrays.

13. The method of claim 1, wherein performing the beamforming communication comprises:
    configuring a set of transmit antenna arrays of the UE based at least in part on the foldable state capability information; and
    transmitting a beamformed signal to the base station via the configured set of transmit antenna arrays.

14. The method of claim 1, wherein the one or more foldable units comprise a rollable folding display or an extendable display.

15. An apparatus for wireless communications having one or more foldable units, comprising:
    a processor;
    memory coupled with the processor, the processor and memory configured to:
      identify foldable state capability information, the foldable state capability information corresponding to a state of the one or more foldable units;
      transmit an indication of the foldable state capability information to a base station in communications with the apparatus; and
      perform a beamforming communication between the base station and the apparatus based at least in part on the foldable state capability information.

16. The apparatus of claim 15, wherein the processor and memory are further configured to:
determine a number of independently foldable units of the one or more foldable units of the UE; and
transmit the number of the independently foldable units in the foldable state capability information to the base station.

17. The apparatus of claim 15, wherein the processor and memory are further configured to:
determine angle information associated with the one or more foldable units; and
transmit the angle information associated with the one or more foldable units in the foldable state capability information.

18. The apparatus of claim 17, wherein the processor and memory configured to determine the angle information are further configured to:
identify an angle separation between a first antenna array of a first foldable unit of the one or more foldable units and a second antenna array of a second foldable unit of the one or more foldable units.

19. The apparatus of claim 17, wherein the processor and memory configured to determine the angle information are further configured to:
obtain relative positioning information from one or more sensors of the UE with respect to a reference direction; and
determine an angle between two or more antenna arrays of the one or more foldable units based at least in part on the relative positioning information.

20. The apparatus of claim 15, wherein the processor and memory are further configured to:
receive the beamformed communication according to a beamwidth used by the base station based at least in part on the foldable state capability information; and
adjust a beamwidth used by the UE based at least in part on the beamwidth used by the base station.

21. The apparatus of claim 15, wherein the processor and memory are further configured to:
determine a foldable state of the UE based at least in part on the one or more foldable units; and
transmit an indication of the foldable state in the foldable state capability information.

22. The apparatus of claim 21, wherein the foldable state of the UE comprises a single quantized state from a set of quantized states associated with the UE.

23. The apparatus of claim 15, wherein the processor and memory are further configured to:
include the indication of the foldable state capability information in a UE capability message.

24. The apparatus of claim 15, wherein the processor and memory configured to perform the beamforming are further configured to:
configure a set of receive antenna arrays of the UE based at least in part on the foldable state capability information; and
receive a beamformed signal from the base station via the configured set of receive antenna arrays.

25. The apparatus of claim 15, wherein the processor and memory configured to perform the beamforming are further configured to:
configure a set of transmit antenna arrays of the UE based at least in part on the foldable state capability information; and
transmit a beamformed signal to the base station via the configured set of transmit antenna arrays.

26. An apparatus for wireless communications having one or more foldable units, comprising:
means for identifying foldable state capability information, the foldable state capability information corresponding to a state of the one or more foldable units;
means for transmitting an indication of the foldable state capability information to a base station in communications with the apparatus; and
means for performing a beamforming communication between the base station and the apparatus based at least in part on the foldable state capability information.

27. The apparatus of claim 26, further comprising:
means for determining a number of independently foldable units of the one or more foldable units of the UE; and
means for transmitting the number of the independently foldable units in the foldable state capability information to the base station.

28. The apparatus of claim 26, further comprising:
means for determining angle information associated with the one or more foldable units; and
means for transmitting the angle information associated with the one or more foldable units in the foldable state capability information.

29. The apparatus of claim 26, wherein the means for determining the angle information comprises:
means for identifying an angle separation between a first antenna array of a first foldable unit of the one or more foldable units and a second antenna array of a second foldable unit of the one or more foldable units.

30. A non-transitory computer-readable medium storing code for wireless communication at a user equipment (UE), the code comprising instructions executable by a processor to:
identify foldable state capability information, the foldable state capability information corresponding to a state of the one or more foldable units;
transmit an indication of the foldable state capability information to a base station in communications with the apparatus; and
perform a beamforming communication between the base station and the apparatus based at least in part on the foldable state capability information.

\* \* \* \* \*